United States Patent
Azadegan et al.

(10) Patent No.: US 6,590,938 B1
(45) Date of Patent: Jul. 8, 2003

(54) DCT DOMAIN CONVERSION OF A HIGHER DEFINITION SIGNAL TO LOWER DEFINITION SIGNAL

(75) Inventors: Faramarz Azadegan, San Diego, CA (US); Krisda Lengwehasatit, Los Angeles, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,823

(22) Filed: Sep. 30, 1999

(51) Int. Cl.[7] .............................. H04N 11/02
(52) U.S. Cl. ................................. 375/240.21
(58) Field of Search .................. 375/240, 240.21, 375/240.2; 348/384.1

(56) References Cited

U.S. PATENT DOCUMENTS

| | | | |
|---|---|---|---|
| 5,262,854 A | 11/1993 | Ng | 358/133 |
| 5,572,236 A | * 11/1996 | Feig et al. | 345/154 |
| 5,767,907 A | 6/1998 | Pearlstein | 348/392 |
| 5,957,998 A | 9/1999 | Ozaki | 708/402 |
| 6,166,601 A | * 12/2000 | Shalom et al. | 330/151 |
| 2001/0055340 A1 | * 12/2001 | Kim et al. | 375/240.21 |

FOREIGN PATENT DOCUMENTS

| | | |
|---|---|---|
| EP | 0 707 426 A2 | 4/1996 |
| EP | 0 884 686 A2 | 12/1998 |
| WO | WO 98/20457 | 5/1998 |
| WO | PCT/US00/26662 | 12/2000 |

* cited by examiner

*Primary Examiner*—Chris Kelley
*Assistant Examiner*—George A Bugg
(74) *Attorney, Agent, or Firm*—Procopio, Cory, Hargreaves & Savitch, LLP

(57) ABSTRACT

Embodiments of the invention comprise a new device and technique to realize an improved conversion of a high resolution signal to a lower resolution signal. This improvement is achieved by replacing an identity matrix with a diagonal matrix in a DCT domain. The diagonal matrix value B is set to be a value that corresponds to a minimized value and/or a threshold value. Successive results form invention are utilized to establish approximate equivalency, where the difference form the absolute true value is less than a predetermined threshold value.

18 Claims, 27 Drawing Sheets

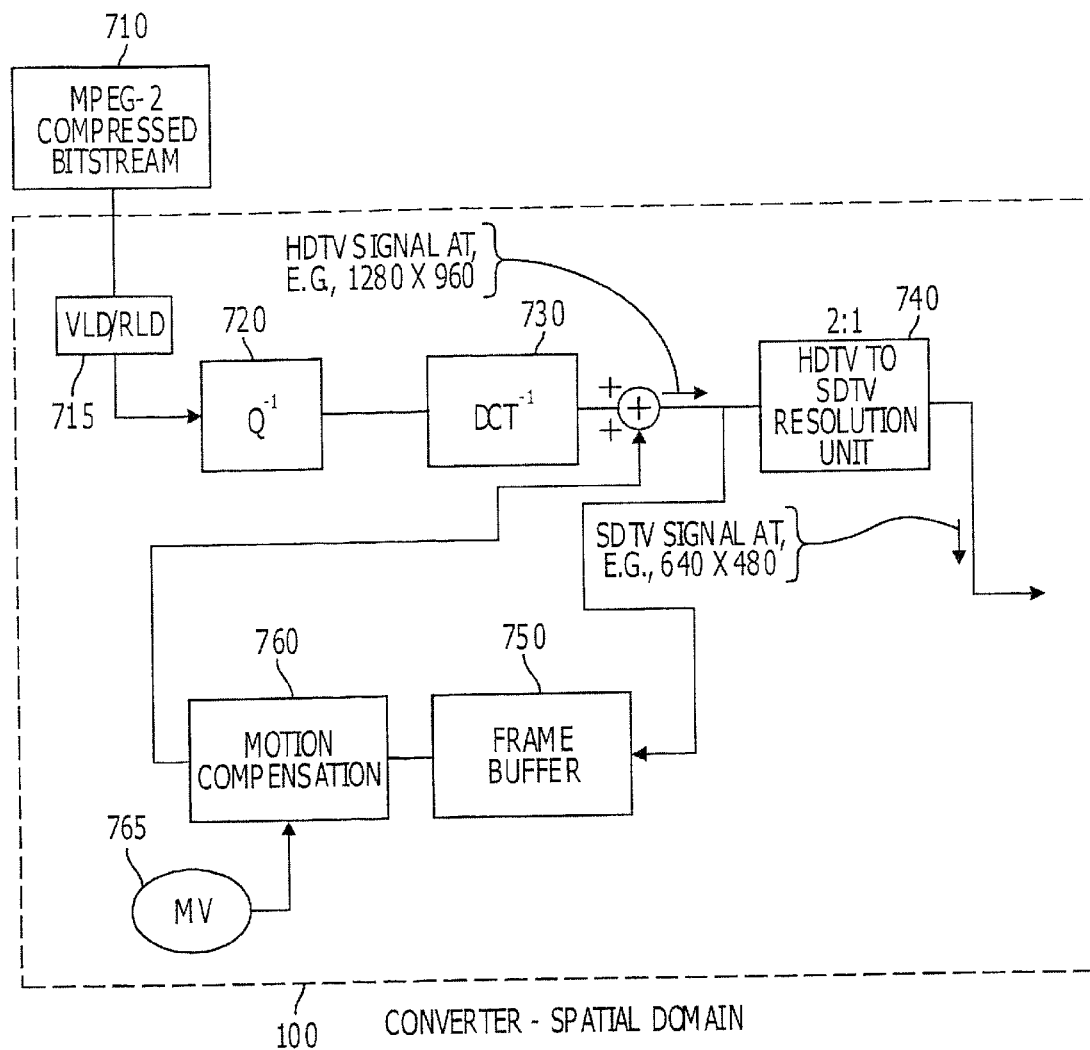
FIG. 7A(1)
PRIOR ART

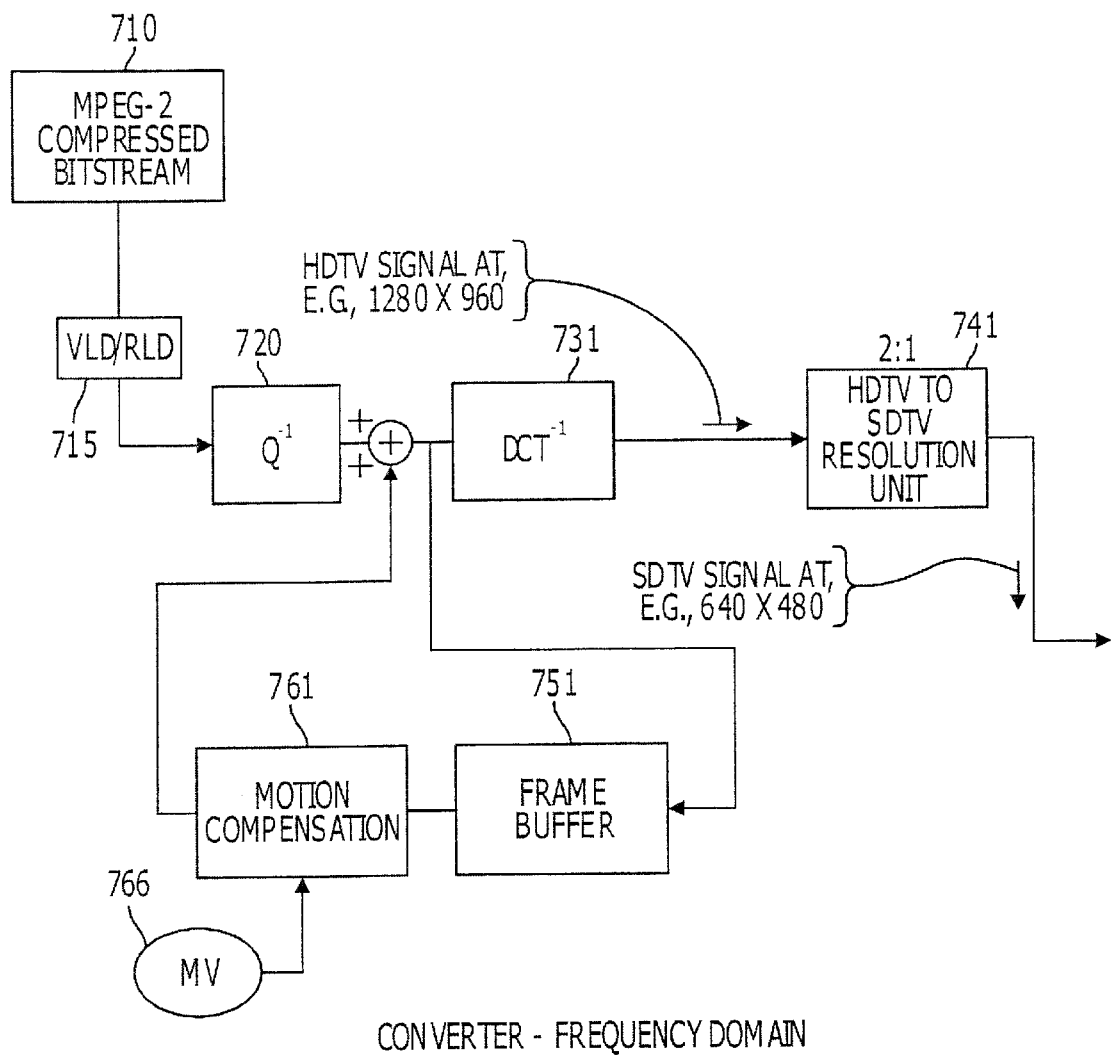
FIG. 7A(2)
PRIOR ART

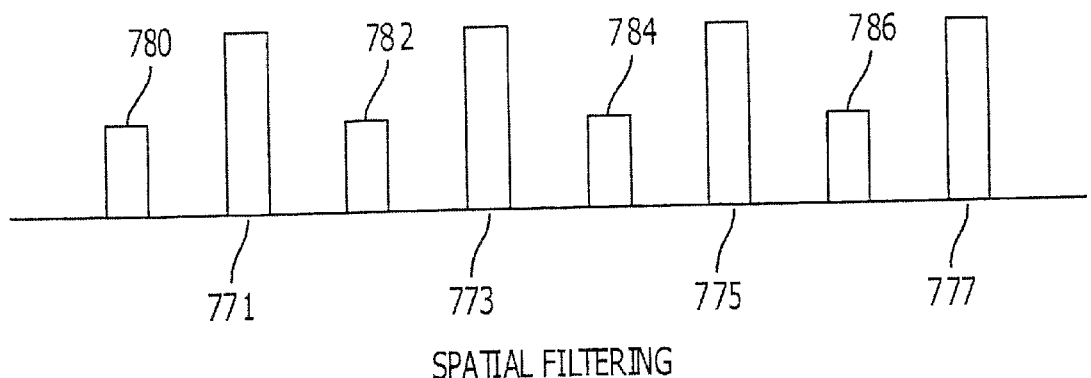
SPATIAL FILTERING
FIG. 7B(1)
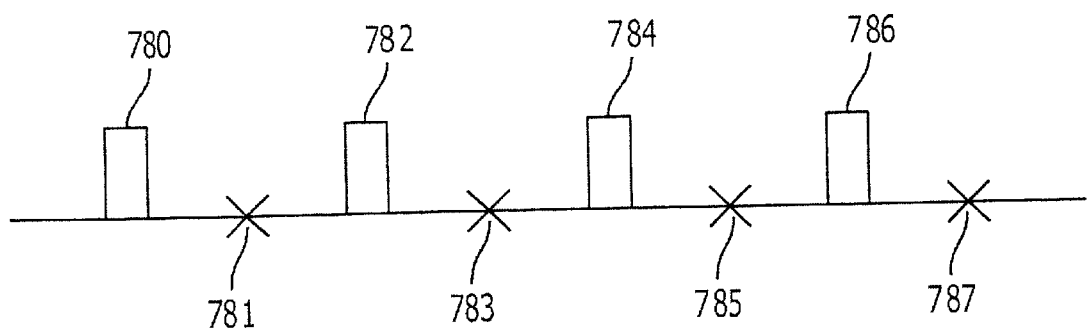
FIG. 7B(2)

FREQUENCY CUT OF FIG. 7A(2)
AND/OR FIG. 8A

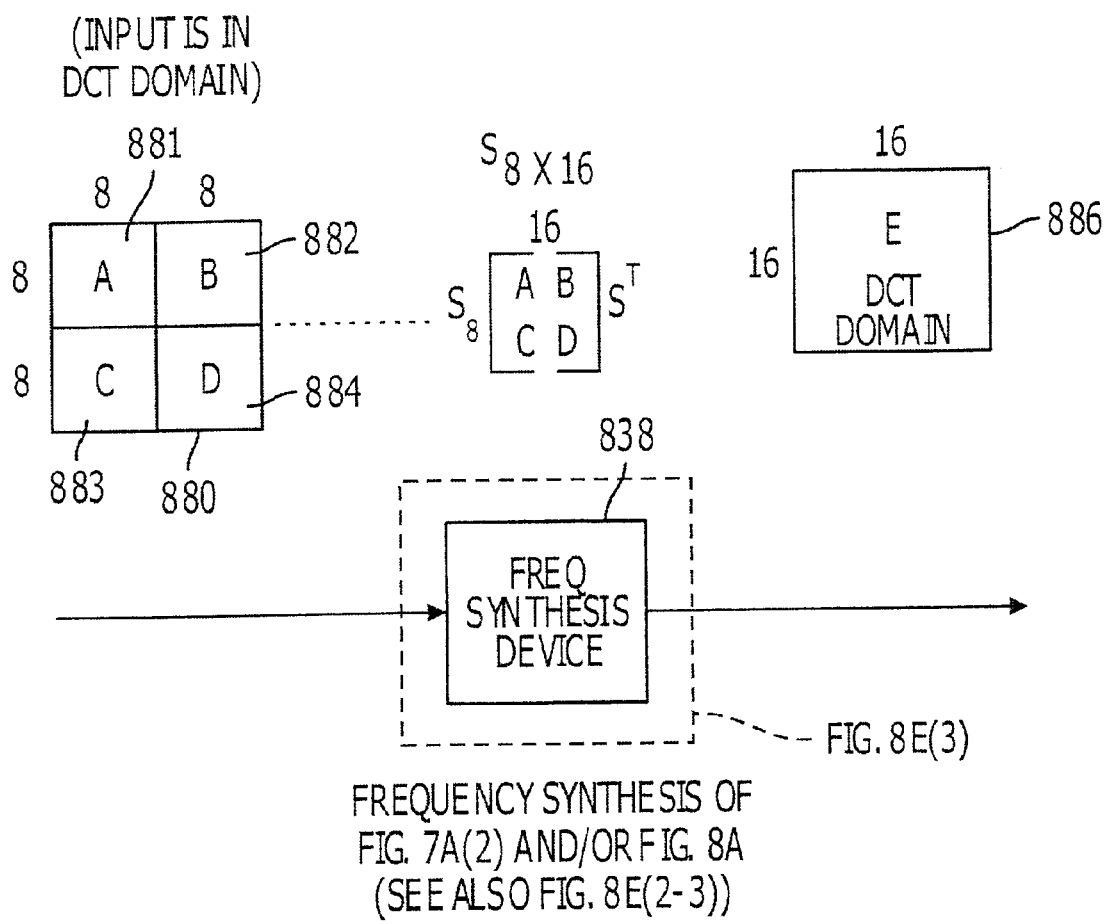
FIG. 8E(1)
PRIOR ART

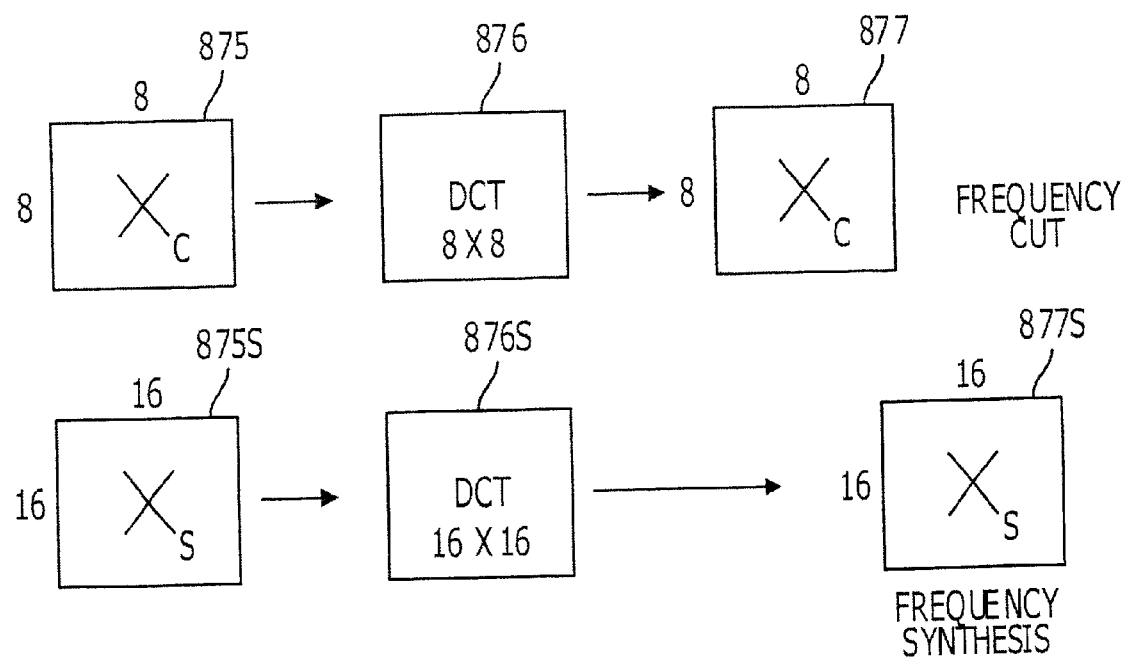
FIG. 8E(2)
PRIOR ART

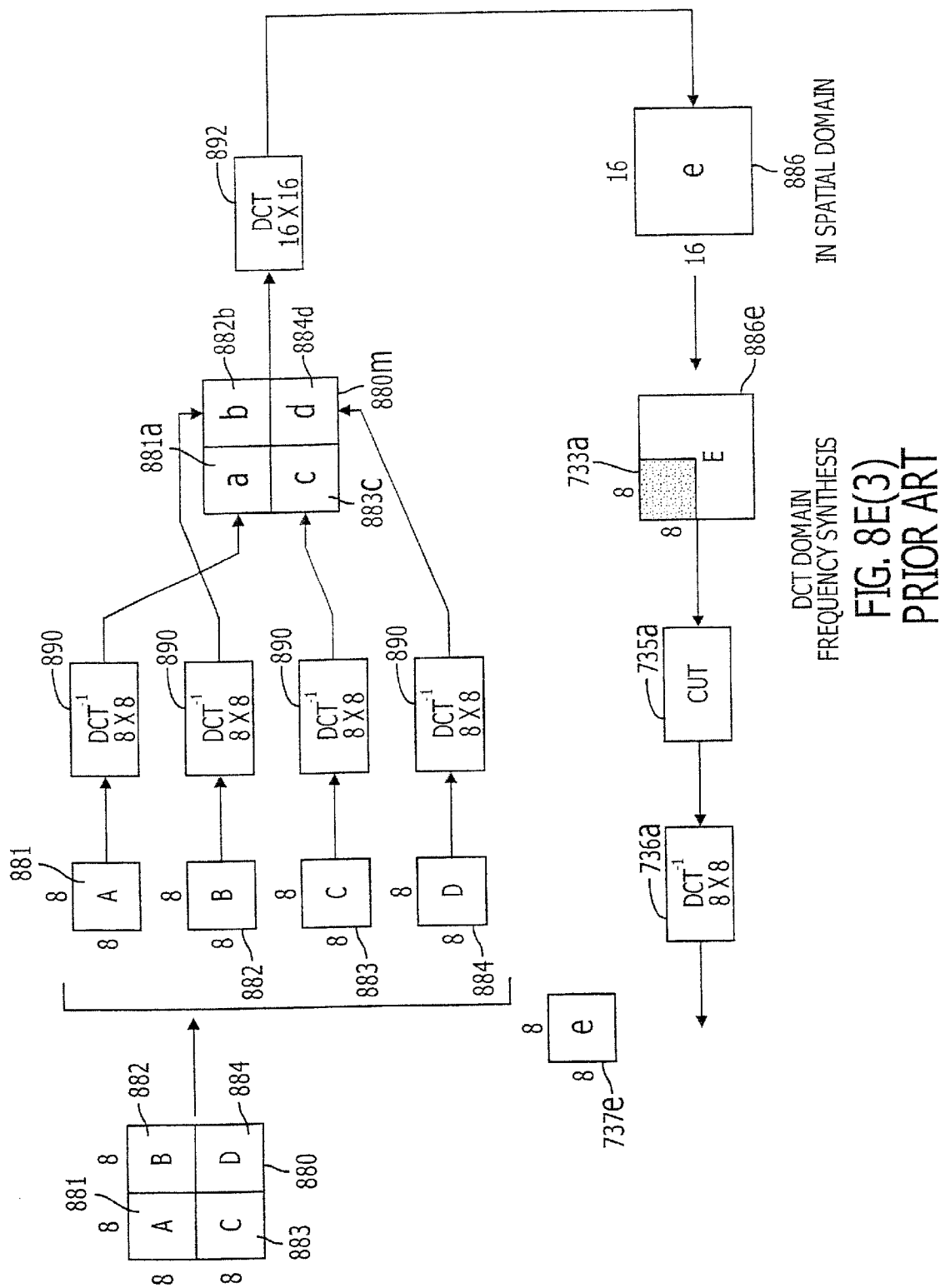
FIG. 8E(3) PRIOR ART

MINIMAL DRIFT MOTION COMPENSATION FOR A 4 X 4 FREQUENCY CUT METHOD.

| ALGORITHM | METHOD | MEMORY (BITS) | COMPUTATION |
|---|---|---|---|
| 1 | SUBSAMPLING OUTSIDE LOOP | W*H*8*3*1.5 FOR 4:2:0<br>W*H*8*3*2 FOR 4:2:2 | 8X8 IDCT/BLOCK<br>64*(2.75 ADD +0.75 SHIFT) /BLOCK FOR MC[1]<br>64*[(L+K+2) MUL + 2(L+K) ADD] FOR SYMMETRICAL FILTERING LENGTH<br>2L+1(VERT), 2K+1(HORZ) |
| 2 | SUBSAMPLING BEFORE LOOP | ¼ OF FIRST METHOD + 8*W*16*CEIL((2L+16)/16) (FOR RESIDUE BUFFER)[2] | 8X8 IDCT/BLOCK<br>64*(7.5625 ADD +0.9375 SHIFT) /BLOCK FOR MC[3]<br>64*[(L+K+2) MUL + 2(L+K+ ADD] FOR SYMMETRICAL FILTERING LENGTH 2L+1, 2K+1 |
| 3 | 4X4 FREQUENCY CUT | ¼ OF FIRST METHOD | 4X4 IDCT/BLOCK[4]<br>16*(7.5625 ADD +0.9375 SHIFT) /BLOCK FOR MC[4] |
| 4 | FREQUENCY SYNTHESIS | ¼ OF FIRST METHOD | 8X8 IDCT/4 BLOCKS<br>16*(7.5625 ADD +0.9375 SHIFT) /BLOCK FOR MC[4]<br>48*(18 MUL+32 ADD) / BLOCK FOR FREQUENCY SYNTHESIS[5] |
| 5A | 4X4 FREQUENCY CUT WITH MINIMAL DRIFT MOTION COMPENSATION (PRECALCULATE REFERENCE) | FOR LUMINANE -><br>3*W*H*8/4+W*H*8*2<br>(RRD)   (FRD)<br>OR 11/12 OF FIRST METHOD | 4X4 IDCT/BLOCK<br>4X4 DCT/BLOCK<br>8X8 PRUNNED (SUBSET INPUT) IDCT[6]<br>8X8 PRUNNED (SUBSET OUTPUT) DCT<br>64*(2.75 ADD +0.75 SHIFT) /BLOCK FOR MC[3] |
| 5B | 4X4 FREQUENCY CUT WITH MINIMAL DRIFT MOTION COMPENSATION (WITHOUT PRECALCULATED REFERENCE)[7] | ¼ OF FIRST METHOD + 32*32*8 BITS FOR MOTION COMPENSATION REGION. | 4X4 IDCT/BLOCK<br>4 OF 4X4 DCT/BLOCK<br>4 OR 8X8 PRUNNED IDCT<br>8X8 PRUNNED DCT<br>64*(2.75 ADD +0.75 SHIFT) /BLOCK FOR MC[3] |
| 6 | DRIFT TRACKING | ¼ OF FIRST METHOD (ADD ¾*W*H*8*2*1.5 OR 2.0 FOR DRIFT TRACKING WITHOUT QUANTIZATION AND COMPRESSION) | 8X8 IDCT/BLOCK<br>64*(2.75 ADD +0.75 SHIFT) /BLOCK FOR MC[3]<br>64*(3/4 ADD +7/4 ADD)/BLOCK FOR DRIFT TRACKING |

COMPLEXITY AND MEMORY COMPARISONS FOR DIFFERENT ALGORITHMS.

[1] HALF-PIXEL MOTION COMPENSATION, ASSUMING AN EQUAL PROBABILITY FOR HALF VS. FULL PIXEL MV
[2] BEFORE FILTERING, CEIL((2L+1)/16) ROWS OF MACROBLOCKS MUST BE BUFFERED.
[3] QUARTER-PIXEL MOTION COMPENSATION, ASSUMING EQUAL PROBABILITY OF MVS.
[4] REQUIRES 8*3 MULTIPLICATIONS, 8*2 SHIFTS, AND 8*9 ADDITIONS. THE SAME FOR THE 4X4 DCT.
[5] AFTER MATRIX EVALUATION, XA, XB, YA, AND YB HAVE BEEN FOUND TO BE SPARSE. FURTHERMORE, THE ELEMENTS IN XA AND XB ARE DIFFERENT ONLY IN POLARITY (+/-). YA AND YB ARE ALSO DIFFERENT ONLY IN POLARITY.
[6] REQUIRES 12*8 MULTIPLICATIONS, 12*1 SHIFTS AND 12*20 ADDITIONS (4 ROWS AND THEN 8 COLUMNS). THE SAME FOR THE 8X8 PRUNNED DCT.
[7] THIS ALGORITHM 5B IS A PREFERRED IMPLEMENTATION AS COMPARED TO THE ABOVE ALGORITHM 5A.

FIG. 11

THE FRAME BY FRAME MEAN SQUARE DIFFERENCE OF "MOBILE" SEQUENCE.

| ROW | ALGORITHM NO. | METHOD\SEQUENCE | FOOTBALL | MOBILE | FLOWER | TEMPETE | TENNIS |
|---|---|---|---|---|---|---|---|
| | | MPEG-2-FILTER (OPEN-LOOP)* | 17.0044 | 22.9808 | 34.6541 | 14.18 | 10.3451 |
| | | 4X4 FREQUENCY CUT (OPEN-LOOP)† | 83.1545 | 195.897 | 174.607 | 95.826 | 102.374 |
| | | 4X4 FREQUENCY CUT (OPEN-LOOP)‡ | 56.7612 | 117.535 | 112.428 | 61.0074 | 57.5779 |
| | | 4X4 FREQUENCY CUT | 119.074 | 245.097 | 238.963 | 132.716 | 126.618 |
| | | FREQUENCY CUT MIN DRIFT (LM) | 95.9061 | 199.414 | 172.246 | 91.9369 | 97.8844 |
| | | FREQUENCY CUT + MIN DRIFT (LC) | 95.8521 | 198.589 | 172.204 | 91.8187 | 97.6103 |
| | | LC + IDCT AFTER MC | 95.3868 | 203.064 | 176.518 | 96.2477 | 105.804 |
| | | LC + RESTORED HIGH DCT | 83.548 | 192.417 | 170.989 | 30.6135 | 95.7934 |
| | | 1M + 1/3 HIGH DCT | 84.2526 | 20.151 | 177.562 | 97.2105 | 105.44 |
| | | FREQUENCY SYNTHESIS | 120.966 | 249.278 | 242.827 | 134.757 | 129.988 |
| | | DIAG-FREQUENCY CUT⁸ | 123.231 | 234.848 | 236.574 | 135.02 | 114.136 |
| | | HALF-MAT FREQUENCY CUT⁸ | 141.73 | 283.037 | 268.592 | 157.059 | 140.847 |
| | | FULL-MAT FREQUENCY CUT⁸ | 155.727 | 327.254 | 308.514 | 174.382 | 172.389 |
| | | DIAG-FREQUENCY CUT(2)⁹ | 179.896 | 328.764 | 320.577 | 180.724 | 158.161 |
| | | HALF-MAT FREQUENCY CUT(2)⁹ | 135.182 | 256.579 | 252.247 | 143.289 | 124.091 |
| | | FULL-MAT FREQUENCY CUT(2)⁹ | 128.01 | 246.108 | 243.527 | 136.499 | 122.52 |
| | | 2X2 AVERAGE | 126.366 | 242.678 | 250.33 | 132.471 | 129.032 |
| | | BASIS SCALING FREQUENCY CUT | 116.136 | 221.667 | 224.79 | 122.904 | 108.426 |
| | | BASIS SCALING FREQUENCY SYNTHESIS | 117.432 | 223.707 | 226.179 | 123.781 | 109.651 |
| | | 4X4 FREQUENCY CUT¹⁰ | 98.2946 | 212.194 | 198.058 | 114.479 | 117.242 |
| | | FREQUENCY SYNTHESIS¹⁰ | 100.353 | 216.564 | 202.129 | 116.705 | 120.37 |
| | | 4X4 FREQUENCY CUT | 76.1538 | 161.386 | 181.692 | 100.198 | 77.6378 |
| | | FREQUENCY CUT + MIN. DRIFT¹¹ (1M) | 33.3933 | 120.751 | 96.6203 | 47.1374 | 61.3949 |
| | | FREQUENCY CUT + MIN. DRIFT¹¹ (1C) | 33.3266 | 119.889 | 96.6525 | 47.0099 | 61.0814 |
| | | LC + IDCT AFTER MC¹¹ | 33.6418 | 115.294 | 96.3321 | 46.8539 | 59.9005 |
| | | LC WITH RESTORED HIGH DCT¹¹ | 2.09893 | 12.9729 | 5.64497 | 3.40529 | 8.3857 |
| | | 1M + 1/3 HIGH DCT¹¹ | 3.90443 | 30.9817 | 9.79278 | 6.9913 | 17.8441 |

THE MEAN SQUARE DIFFERENCE OF DIFFERENT ALGORITHMS.

* COMPARED WITH AN UECODED ORIGINAL SEQUENCE WITH FREQUENCY CUT/DOWNSAMPLING.
† USING A DFT-BASED OPTIMIZATION
‡ USING A DFT-BASED OPTIMIZATION
¹⁰ COMPARED WITH AN MPEG-2 FILTERING OPEN-LOOP METHOD
¹¹ COMPARED WITH A FREQUENCY CUT OPEN LOOP METHOD

FIG 19

| ROW NO. | ALGORITHM NO. | METHOD\SEQUENCE | FOOTBALL | MOBILE | FLOWER | TEMPETE | TENNIS |
|---|---|---|---|---|---|---|---|
| | | 1. MPEG-2 FILTER | 3.23125 | 21.0477 | 11.1346 | 6.74656 | 11.7831 |
| | | FREQUENCY CUT | 32.8725 | 292.487 | 163.377 | 145.37 | 67.4448 |
| | | FREQUENCY SYNTHESIS | 36.4409 | 300.426 | 170.09 | 154.599 | 66.7865 |
| | | FREQUENCY CUT + BASIS SCALING | 32.2299 | 229.578 | 135.129 | 111.187 | 50.8185 |
| | | FREQUENCY SYNTHESIS + BASIS SCALING | 34.273 | 235.239 | 140.072 | 118.883 | 50.1278 |
| | | FREQUENCY CUT COMPARED WITH 1 | 29.5995 | 271.551 | 151.757 | 138.077 | 58.7754 |
| | | FREQUENCY SYNTHESIS COMPARED WITH 1 | 33.0374 | 280.018 | 158.371 | 147.485 | 57.2726 |

THE MEAN SQUARE DIFFERENCE OF THE FIRST (1-) FRAMES

FIG. 20

LOSSLESS COMPRESSION OF REFERENCE FRAMES FOR MOTION COMPENSATION.

| ROW | METHOD | MEMORY | COMPLEXITY/BLOCK | QUALITY/MSE |
|---|---|---|---|---|
| | OPEN-LOOP FREQUENCY CUT | 3 FRD (1) | FP: 176 ADD + 48 SHIFT (HALF-PEL)<br>RA: 64 ADDS<br>IDCT: ONE 8X8 IDCT<br>POST. PROC.: PRUNNED 8X8 DCT+ 4X4 IDCT (372 ADD +121 MUL) | BASELINE |
| | FREQUENCY CUT (ORIGINAL) (IMPLEMENTED) | 3 RRD (1/4) | FP: 121 ADD + 15 SHIFT (QUARTER PEL)<br>RA: 16 ADDS<br>IDCT: ONE 4X4 IDCT | 119.53 |
| | MINIMAL DRIFT #3 (IMPLEMENTED) | 2 FRD + 1 RRD + 1 MB$^{12}$ + 1 RRD$^{13}$ | MD: (4X4DCT +PURNNED 8X8 IDCT) $(1-a_B)$ = (324 ADD + 144 MUL) $(1-a_B)$<br>FP: 176 ADD +48 SHIFT (HALF-PEL)<br>RA: 64 ADDS<br>IDCT: ONE 4X4 IDCT | 71.59 |
| | MINIMAL DRIFT # 2 | 1 FRD + 2 RRD + 4 MB$^{12}$ | **MD*: (324 ADD +144 MUL) $(1-a_B)$ + (909.125 ADD +498.09375 MUL)$_{a_b}$<br>MD:** (324 ADD +144 MUL) $(1-a_B)$ +4* (3424ADD +144 MUL)$_{a_b}$<br>FP: 176 ADD +48 SHIFT (HALF-PEL)<br>RA: 64 ADDS<br>IDCT: ONE 4X4 IDCT | ~71.59 |
| | MINIMAL DRIFT # 1 | 3 RRD + 4 MB | **MD*: (909.125 ADD +498.09375MUL) $(a_f+a_b)$<br>MD:** 4* (324 ADD +144 MUL) $(a_f+a_b)$<br>FP: 176 ADD +48 SHIFT (HALF-PEL)<br>RA: 64 ADDS<br>IDCT: ONE 4X4 IDCT | ~71.59 |
| | MINIMAL DRIFT #1.1 (ALTERNATE IMPLEMENTATION) | 3 RRD + 9 MB | MD: 3* (324 ADD +144 MUL) $(a_f+a_b)$<br>FP: 176 ADD +48 SHIFT (HALF-PEL)<br>RA: 64 ADDS<br>IDCT: ONE 4X4 IDCT | 71.88 |
| | LOSSLESS LOOP | 1 RRD (OUTPUT) + 4 MB + VARYING MEMORY SIZE FOR TWO COMPRESSED REFERENCE FRAMES | MC: (1315.125 ADD + 680.09375 MUL) $(a_f+a_b)$ + DE/COMPRESSION $(1-a_B)$<br>FP: 176 ADD +48 SHIFT (HALF-PEL)<br>RA: 64 ADDS<br>IDCT: ONE 4X4 IDCT | NA (CAN BE AS SMALL AS THE BASELINE) |

WHERE $a_B$ IS A PERCENTAGE OF B-FRAMES, AND WHERE $a_f$ AND $a_b$ ARE A PRECENTAGE OF THE FORWARD AND BACKWARD PREDICTION MACROBLOCKS, RESPECTIVELY.

MEMORY-COMPLEXITY-QUALITY COMPARISON OF VARIOUS FREQUENCY CUT METHODS

[12] MACROBLOCK MEMORY FOR FORMING THE PREDICTION AREA.
[13] FOR PROPER DISPLAY PURPOSES.

FIG. 22

FREQUENCY CUT WITH MINIMAL DRIFT MC FLOW CHARTS.

DCT DOMAIN CONVERSION OF A HIGHER DEFINITION SIGNAL TO LOWER DEFINITION SIGNAL

FIELD OF THE INVENTION

This invention relates generally to the decoding and signal conversion of video signals. More specifically, preferred embodiments of this invention relate to an apparatus, system, and method for converting a higher definition video signal into a lower definition video signal within a Discrete Cosine Transfer ("DCT") domain.

DESCRIPTION OF THE RELATED ART

High-Definition Television ("HDTV") provides an improved resolution as compared to conventional Standard Definition television ("SDTV"). However, HDTV is only slowly being implemented. There are a number of reasons for this slow implementation.

For example, there are several competing formats within the HDTV standard. The cost of implementing this plurality of HDTV formats is expensive. Another problem is that the HDTV signals are transmitted in a digital format. In contrast, conventional SDTV's receive programming in an analog format that is based upon the National Television Systems Committee (NTSC) standard. Thus, because the NTSC format signals are analog and the HDTV signals are digital, they are fundamentally incompatible with each other.

Yet another problem is that the conventional SDTVs are already widely implemented. Conventional SDTVs are based upon very mature NTSC technology, and thus have achieved wide popularity, with each household in the United States averaging more than one SDTV. Also, the successive years of SDTV design and integration have reduced the cost of SDTV dramatically.

In contrast, because HDTV has just recently become available, and HDTV is a new and complex technology, HDTV can be many times more expensive than SDTVs. Because of the initial high cost of HDTV, the NTSC based SDTVs will likely continue to be popular, at least until HDTV is more available and affordable.

Until the likely transition to HDTV is complete, SDTVs will be in widespread use. However, during this transition time, more and more television transmissions will be solely in an HDTV digital format. Thus, it will be particularly useful to efficiently convert an HDTV signal to an SDTV signal.

Specifically, all of the HDTV formats support a wider screen, and up to roughly twice the resolution than the NTSC SDTV in both the horizontal and vertical directions. This increased screen format, along with the increased resolution, requires that a significantly greater amount of data be transmitted to support the HDTV formats. To transmit this additional data through the current 6 Megahertz bandwidth TV channels, the HDTV video signals are digitized and then compressed before they are transmitted. An HDTV transmission is very economical with respect to bandwidth when digitally compressed. For example, one channel of HDTV can be transmitted in the same 6 MHz bandwidth that is needed to accommodate one NTSC SDTV channel. After transmission, the HDTV video signals are then decompressed, e.g., when they reach the SDTV location, and are then converted into analog signals for display.

However, several problems arise when attempting to convert an HDTV signal for display on an SDTV. Conventional solutions utilize either a DCT domain processing or a spatial domain post-processing. The DCT-domain processing consists of two different techniques, namely a frequency cut technique and a frequency synthesis technique.

For example, the conventional spatial techniques consist of post-filtering of the decoded image. First, the signal frames are decoded. Then the decoded frames, or the fields, are filtered into a lower resolution standard definition signal. The filter selected depends upon the change in resolution desired. Conventionally, this post-filtering results in a half resolution in both the horizontal and the vertical directions of the output image. This essentially provides for a 2:1 resolution conversion.

Alternatively, in the frequency domain, a frequency cut may be utilized in the DCT domain that essentially eliminates the high frequencies. However, the results from this frequency cut are not good and thus generates a degraded signal. However, this degradation of the video signal depends upon the visual scene that is being transmitted. If there are high-frequency components that comprise at least a portion of this scene, then this frequency cut technique creates problems in the output quality display.

Specifically, in the DCT domain for the conventional frequency cut technique, only the 16 lower frequency coefficients, i.e., the coefficients in the 4×4 upper left quadrant of the 8×8 DCT are kept, and the rest of the coefficients are discarded. Then, a 4×4 inverse discrete cosine transform ("IDCT") is performed on these remaining coefficients, so as to result in a 4×4 spatial block.

Another alternative in the DCT domain is the conventional frequency synthesis technique. In the frequency synthesis technique, four 8×8 nearest neighbor blocks, forming a 2×2 constellation, are combined to produce an 8×8 block in the spatial domain.

In each of these two DCT domain frequency techniques, the resolution of the decoded image is reduced to one-half in both the horizontal and the vertical directions. Again, this essentially allows for a 2:1 conversion of the signal.

However, several problems arise from these conventional techniques. In some cases, the signal to noise ratio ("SNR"), and/or the subjective quality of the decoded video when displayed for the user, deteriorates to a less than desirable level.

Further, other problems include increased memory requirements and computational complexity. One problem is that in the frame field portion of the spatial domain conversion, a frame memory is required to be as large as the size of a frame of the HDTV signal. This creates a relatively high memory requirement in order to improve the video quality. If the frequency domain solution is instead utilized, then less memory is generally required because the conversion is conventionally done in the DCT domain. This frequency domain lower memory requirement is because the frame memory is essentially the same size as the frames associated with the output signal, i.e., the lower resolution signal. However, the problems with the output quality become more pronounced. Thus each solution has its respective tradeoffs.

What is needed is a device and method for converting a higher resolution signal to a lower resolution signal while reducing at least one of the memory size requirement and the computational complexity requirement, yet maintaining a relatively high-quality signal for output on a display.

SUMMARY OF THE DISCLOSURE

Embodiments of the present invention are best understood by examining the detailed description and the appended claims with reference to the drawings. However, a brief summary of embodiments of the present invention follows.

Briefly described, an embodiment of the present invention comprises a device and a method that provides for the improvement of the conversion of a higher definition signal into a lower definition signal.

Embodiments of the present invention comprise a new device and technique to realize an improved conversion of a higher definition signal into a lower definition signal, while reducing the relative memory requirement and/or the relative computational complexity requirement, yet maintaining a relatively good quality of the output video signal. This improvement is achieved by utilizing a diagonal matrix in place of at least one identity matrix while processing the signal in the DCT domain.

For example, in one embodiment of the present invention, a Motion Picture Experts Group 2 ("MPEG-2") digital signal may be received and decoded and/or decompressed. Next, the signal is placed in the DCT domain. In this embodiment, the signal is preferably in a two-dimensional domain and in a matrix form. The signal is then processed.

During processing, the signal is first pre-multiplied with a predetermined diagonal matrix, that may be referred to as a "B" matrix. Then, the results are post-multiplied again with the same diagonal, or B, matrix. After the pre-and post-multiplying of the signal, the resulting smaller-size DCT matrix is then inverse DCT transformed over the smaller size. Finally, the signal is then made available for output, e.g., to a display such as a television or a computer monitor.

In one embodiment, the present invention is utilized to convert an HDTV signal into an SDTV signal, preferably providing a 2:1 conversion. However, in other embodiments of the present invention, techniques may be utilized to provide any N-to-M conversion ratio, where M is a non-zero integer and where N is a non-zero integer that is greater than M.

In other alternate embodiments, techniques of the present invention may be utilized to convert any relatively higher resolution signal to a relatively lower resolution signal. For example, while some embodiments receive an MPEG-2 type signal, other embodiments of the present invention are also applicable to any signal, including a non-compressed and non-encoded signal. Any signal that may be processed, for example, in a digital signal processor ("DSP"), may be converted to a lower resolution utilizing the present invention.

In yet other alternate embodiments of the present invention, any signal, not merely a television signal, may be converted from a higher resolution or complexity signal to a lower resolution or complexity signal by utilizing the present invention.

In other alternate embodiments, the present invention may be utilized as a portion of an algorithm to convert signals to a lower resolution or a lower complexity. Also, embodiments of the present invention may be utilized with a DSP, or may be implemented either partially or wholly in electrical circuitry.

Other arrangements and modifications will be understood by examining the detailed description and the appended claims with reference to the drawings.

BRIEF DESCRIPTIONS OF THE DRAWINGS

Embodiments of the present invention are described in detail herein with reference to the drawings in which:

FIG. 7A(1) is an illustration of a conventional technique for the spatial domain;

FIG. 7A(2) is an illustration of a conventional technique for the frequency domain;

FIG. 7B(1) is an illustration of a conventional spatial filtering technique;

FIG. 7B(2) is an illustration of a portion of the conventional frequency domain technique;

FIG. 8E(1) illustrates a simplified block diagram of a frequency synthesis technique in a DCT domain;

FIG. 8E(2) illustrates a block diagram of an alternate arrangement of a frequency sysnthesis technique;

FIG. 8E(3) illustrates a simplified block diagram of a DCT domain frequency sysnthesis technique;

FIG. 11 is an illustration of exemplary complexity and memory comparisons for different algorithms, in accordance with the principles of an embodiment of the present invention;

FIG. 19 is an illustration of an exemplary mean square difference of different algorithms, in accordance with the principles of an embodiment of the present invention;

FIG. 20 is an illustration of an exemplary mean square difference of the first (I-) frames, in accordance with the principles of an embodiment of the present invention;

FIG. 22 is an illustration of an exemplary memory-complexity-quality comparison of various frequency cut methods, in accordance with the principles of an embodiment of the present invention.

The accompanying drawings, wherein like numerals denote like elements, are incorporated into and constitute a part of the specification, and illustrate presently preferred exemplary embodiments of the invention. However, it is understood that the drawings are for purpose of illustration only, and are not intended as a definition of the limits of the invention. Thus, the drawings, together with the general description given above, and the detailed description of the preferred embodiments given below, together with the appended claims, serve to explain the principles of the invention.

DETAILED DESCRIPTION OF PREFERRED EMBODIMENTS

The accompanying drawings refer to and illustrate descriptions of exemplary embodiments of the present invention. It is to be understood that other embodiments may be practiced, and structural changes and/or implementation variations may be made and utilized without departing from the scope and spirit of the invention described herein.

Figure 1A:
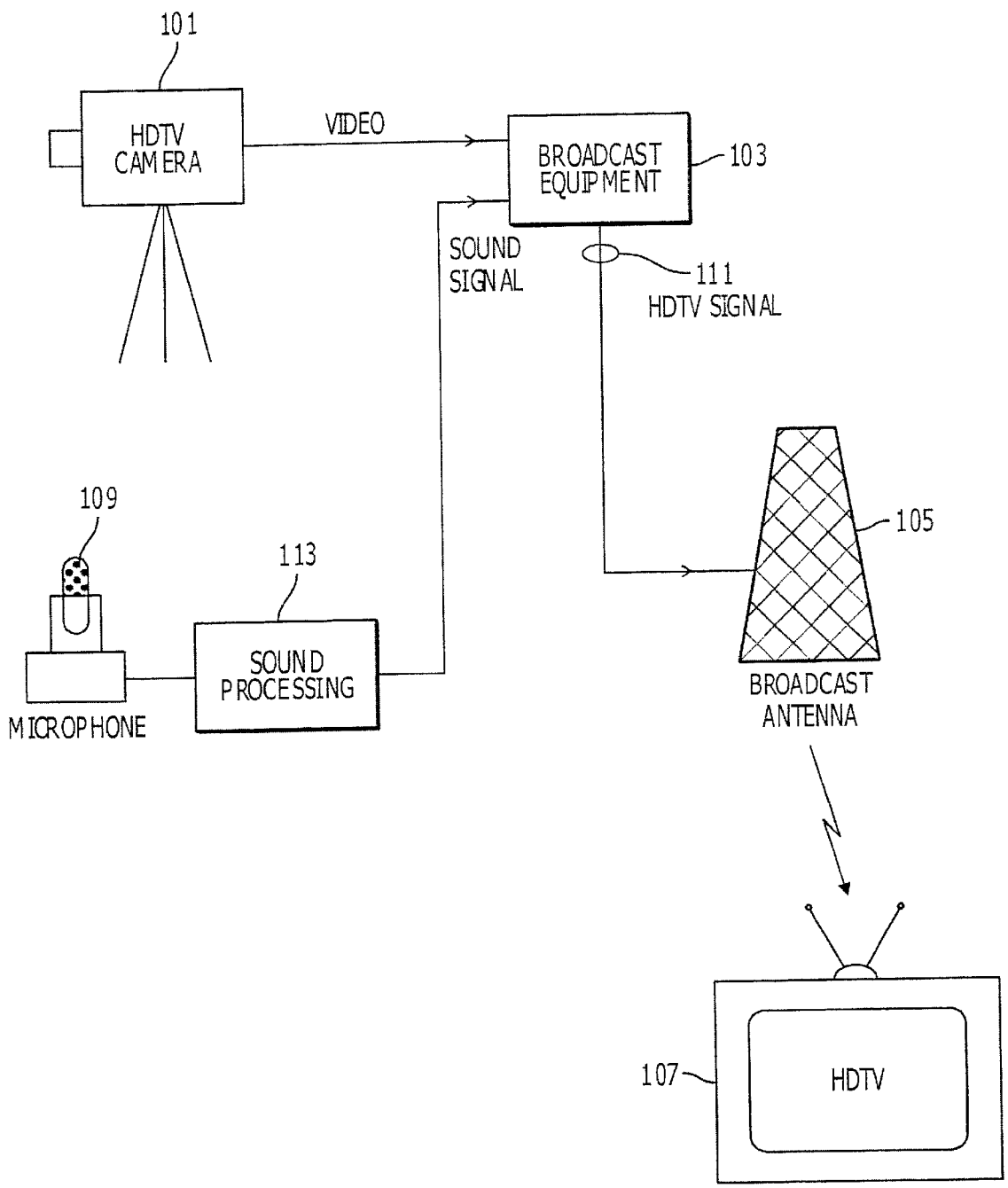
FIG. 1A is an illustration of an environment in which High Definition Television (HDTV) signals are distributed and displayed on an HDTV device.
Figure 1B:
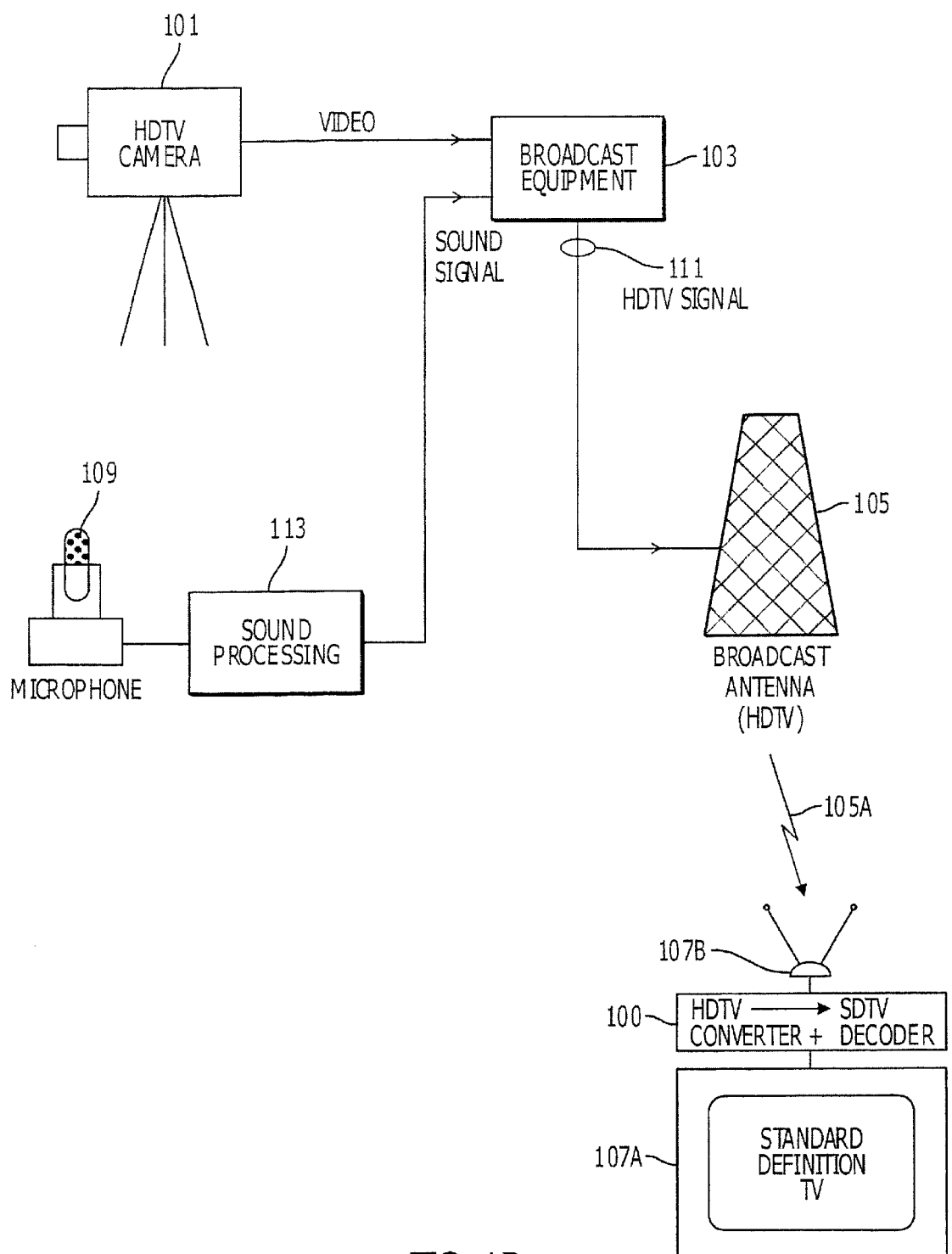
FIG. 1B is an illustration of an exemplary environment in which High Definition Television (HDTV) signals are distributed and converted to Standard Definition Television (SDTV) signals, in accordance with the principles of an embodiment of the present invention.

Various embodiments of the present invention are illustrated utilizing an HDTV to an SDTV converter device 100 of FIG. 1B. FIGS. 1–23 illustrate various techniques in the practice of some of the embodiments of the present invention. It will be understood by one skilled in the art that, e.g., various components of the present invention, as illustrated in FIGS. 1–23, are not shown in order to simplify the illustrations.

FIG. 1B illustrates the converter device 100 that comprises an exemplary embodiment of the present invention. In FIG. 1B, a video camera, e.g., a HDTV camera 101 provides a video output that is transmitted to conventional broadcast equipment 103. Broadcast equipment 103 also receives a sound signal from a conventional sound processing unit 113. In this example, the sound processing unit 113 receives a sound signal from a microphone 109.

The broadcast equipment 103 then transmits both the sound signal and the video signal as an HDTV signal 111 to, e.g., an HDTV broadcast antenna 105. The HDTV broadcast antenna 105 then transmits a signal 105A, in this example through the air, that is received by an antenna 107B.

In this embodiment, the antenna 107B then transmits the received signal to the HDTV to SDTV converter and decoder 100. The HDTV to SDTV converter and decoder 100 first decodes the HDTV signal and then further converts the signal for output to a standard definition TV 107A for display.

In FIG. 1B, the HDTV signal 111 may be transmitted by the broadcast antenna 105 in an MPEG-2 format. However, other compression and coding formats are well within the scope of this invention. For example, other MPEG encoding protocols, including MPEG-1, MPEG-2, MPEG-4, and MPEG-7 may be utilized. Also, any other compression and/or coding schemes, including Joint Photographic Experts Group ("JPEG") and any other compression and/or coding scheme may be utilized as desired in the transmission of the signal as a portion of the embodiment of the present invention. However, it is to be understood by one skilled in the art that no compression or coding need be done to the signal prior to conversion in yet other embodiments of the invention.

It will also be understood by one skilled in the art that the signal need not be received through the air. Instead, the signal may be transmitted or received in any manner, including over cable or telephone lines, from spacecraft, and by any other process, method or device.

The following detailed description first describes an overview of an embodiment of the present invention. Next, with reference to FIGS. 1–6, a detailed discussion of an overview of an MPEG-2 signal technique that may be utilized with some of the various embodiments of the present invention is described. Then, with reference to FIGS. 7–9, a more detailed description of various embodiments are also illustrated, for which the present invention may be adapted and embodied within. Next, a detailed description of just some of the various techniques for converting a signal from a high resolution to a lower resolution are illustrated. Finally, with reference to FIGS. 10–23, a very specific and detailed description of various preferred alternate embodiments in the practice of the present invention are described. However, it will be understood by one skilled in the art that any of these embodiments, as described herein, are merely exemplary and that the present invention is broad in scope so as to not be limited to the specific detailed exemplary embodiments as described herein.

For example, a number of the exemplary embodiments illustrate a 2:1 resolution conversion. However, in many other embodiments of the present invention, techniques may be utilized to provide any N-to-M conversion ratio, where M is a non-zero integer, and where N is a non-zero integer that is greater than M.

Further, in other alternate embodiments of the present invention, techniques may be utilized to convert any relatively high resolution signal to a relatively lower resolution signal. For example, any signal that may be processed, such as in a DSP, may be converted to a lower resolution by utilizing the present invention.

Further, in yet other alternate embodiments to the present invention, any signal, not merely a television signal, may be converted from a high resolution signal and/or a higher complexity signal to a lower resolution and/or complexity signal by utilizing the present invention.

Embodiments of the present invention comprise a new device and technique to realize an improved conversion of a higher definition signal into a lower definition signal, while reducing the relative memory requirement and/or the relative computational complexity requirement, yet maintaining a relatively good quality of the output video signal. This improvement is achieved by utilizing a diagonal matrix in place of at least one identity matrix while processing the signal in the DCT domain.

For example, in one embodiment of the present invention, a MPEG-2 digital signal may be received and decoded and/or decompressed. Next, the signal is placed in the DCT domain. In this embodiment, the signal is preferably in a two-dimensional domain and in a matrix form. The signal is then processed.

During processing, the signal is first pre-multiplied with a predetermined diagonal matrix, that may be referred to as a "B" matrix. Then, the results are post-multiplied again with the same diagonal, or B, matrix. After the pre-and post-multiplying of the signal, the resulting smaller-size DCT matrix is then inverse DCT transformed over the smaller size. Finally, the signal is then made available for output, e.g., to a display such as a television or a computer monitor.

In an embodiment of the present invention, the down-conversion is performed directly in the DCT, e.g., frequency, domain.

In other alternate embodiments, the present invention may be utilized as a portion of an algorithm to convert signals to a lower resolution or a lower complexity. Also, embodiments of the present invention may be utilized with a DSP, or may be implemented either partially or wholly in electrical circuitry.

Now, with reference to FIGS. 1–6, a more detailed description of an exemplary MPEG-2 signal is described, that is utilized in accordance with the principles of an embodiment of the present invention.

FIG. 1 illustrates an example environment in which aspects of the invention may be found. In FIG. 1A, a high definition television camera 101 produces a video signal that is coupled into the broadcast equipment 103. Also, a microphone 109 couples sound via a sound signal into the sound processing system 113. The sound signal is also coupled into the broadcasting equipment 103. The broadcast equipment digitizes and compresses the sound and video signal, thus producing an encoded HDTV signal 111.

The HDTV signal 111 is then coupled into the broadcast antenna 105. The HDTV signal 111, comprising MPEG-2 packets, is then broadcast through the air and finds its way to a high definition television, or HDTV 107, where it is displayed.

Figure 2:
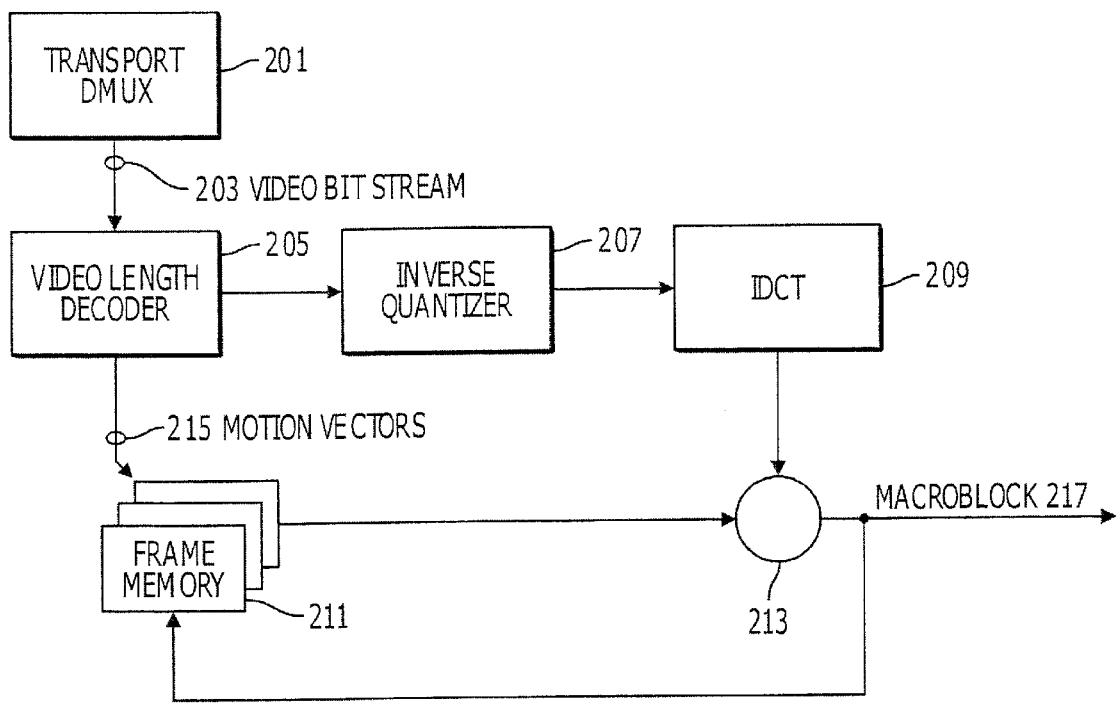
FIG. 2 is an illustration of a video decoder block diagram illustrating an MPEG-2 video decompression, in accordance with the principles of an embodiment of the present invention.

FIG. 2 is a video decoder block diagram illustrating the basics of an MPEG-2 video decompression. The transport demultiplexer, or DMUX 201, receives the MPEG-2 packets that contain the encoded video and audio information in HDTV signal 111. The transport DMUX 201 then produces a video bitstream 203 from the MPEG-2 packets.

The video bitstream 203 is then coupled into a variable length decoder/run-length decoder 205. The variable length/run-length decoder 205 restores the original bitstream, replacing the run-length encoding and variable length encoding by a stream of bits representing DCT coefficients and motion vector values and other book-keeping information. This bitstream is next coupled into an inverse quantizer 207.

It should be noted that when the video is originally sampled, it is also quantized. In other words, different digital levels are assigned to different video levels. A quantizer may be a uniform scaler type quantizer. This corresponds to a staircase of equal spacing of steps, so that a continuum of input values is divided into a number of increments of equal size. In this case, the amount that any step can differ from the actual value is ½ of a step.

Also, quantizers may be non-uniform. Quantizers may be used to encode data so that the values that are more prevalent in a picture, or scene, may have smaller steps assigned to them. In this manner, the amount of error can be reduced for the more prevalent values within a picture.

Further, quantization may change between scenes or between different MPEG-2 signals. Thus, this quantization must be removed, in order for the decompression hardware and algorithms to operate on a uniform bitstream.

After the coeffients are inversely quantized, they are coupled into an inverse discrete cosine transformer, or IDCT 209. The IDCT 209 produces the coefficients for the DCT blocks.

In addition to these coefficients that are decoded, motion vectors 215 are also decoded, as illustrated in FIG. 2. Motion vectors 215 correspond to a previous area in the frame. The specific area in the frame is picked up from previously decoded frames. The motion vectors 215 are then added to the coefficients from the IDCT 209 in adder 213 to produce a macroblock 217 signal. The macroblock represents a part of a moving image and can be inserted back into frame memory, if it is needed.

Figure 3:
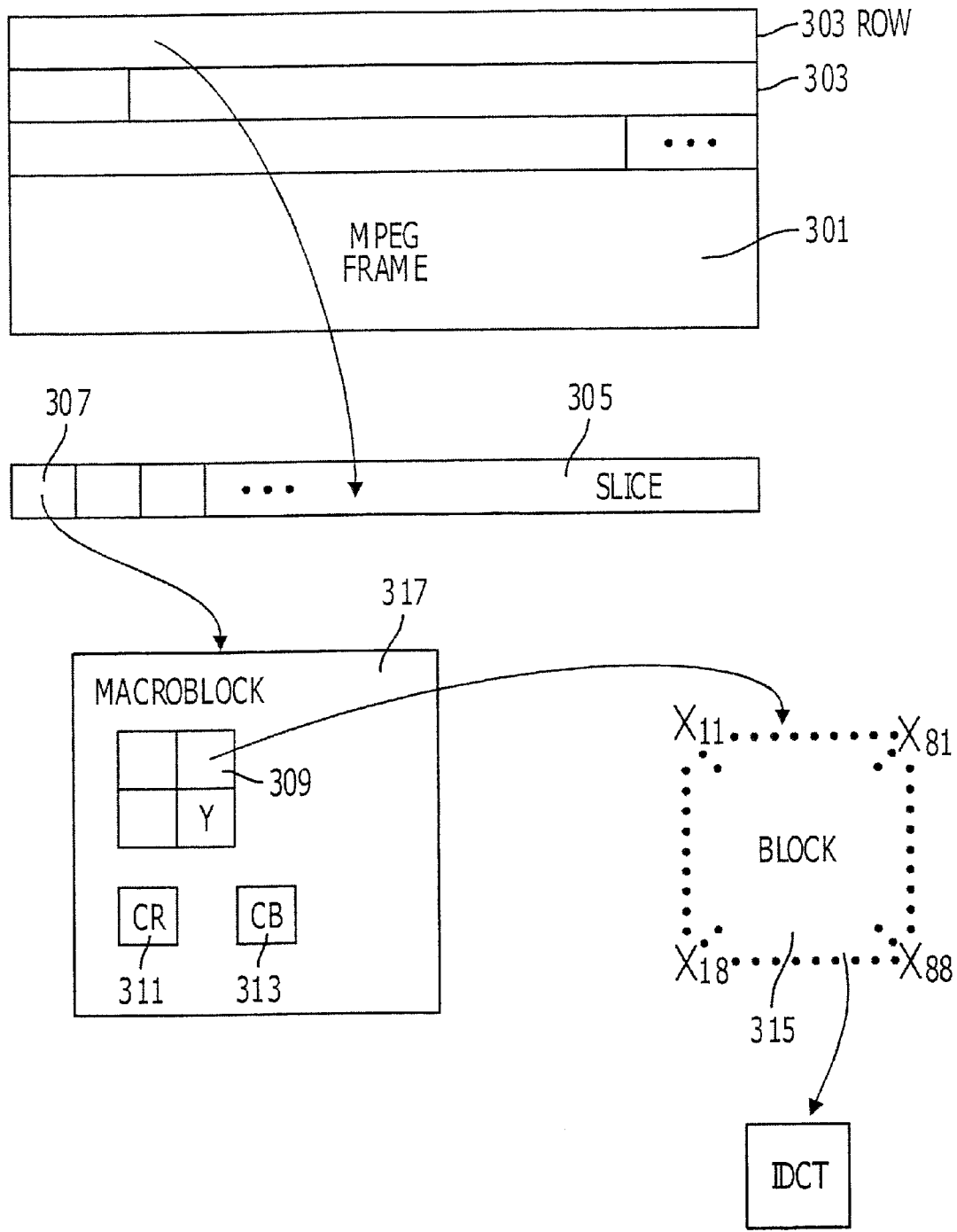
FIG. 3 is a simplified illustration of the format of MPEG-2 video compression, in accordance with the principles of an embodiment of the present invention.

FIG. 3 is a simplified illustration of the format of MPEG-2 video compression. A (MPEG-2) video frame 301 is illustrated in FIG. 3. The (MPEG-2) video frame 301 is equivalent to vertical field scans of a television receiver. Within the MPEG-2 frame 301 there are rows of macroblocks 303. Each row of macroblocks 303 contains 16 lines of video. The rows of macroblocks 303 are further divided into slices 305. A slice 305 is a sequence of macroblocks that start and end at the same row. Slice 305 illustrates a slice of MPEG-2 data that is comprised of macroblocks, such as the contained macroblock 307.

Each macroblock has a particular format 317. A macroblock contains three distinct sections. The first section is a luminance matrix 309. It comprises a 16×16 matrix of luminance coefficients corresponding to four blocks. Also, within the macroblock there are 2 blocks containing color components. Each block consists of 8 pixels in the horizontal direction and 8 lines in the vertical directions generally referred to as 8×8 block. DCT operation is conducted on these 8×8 blocks.

As to the color components, for example, the CR matrix contains color components for the red contribution to the macroblock, and the CB matrix 313 has components that correspond to the blue contribution of the macroblock. The Y matrix contains four 8×8 blocks of information as shown in 315. These blocks of data, i.e., both the Y blocks and the chroma blocks, are in the form of DCT blocks to be converted from DCT blocks. The coefficients in each block must go through an IDCT.

Figure 4:
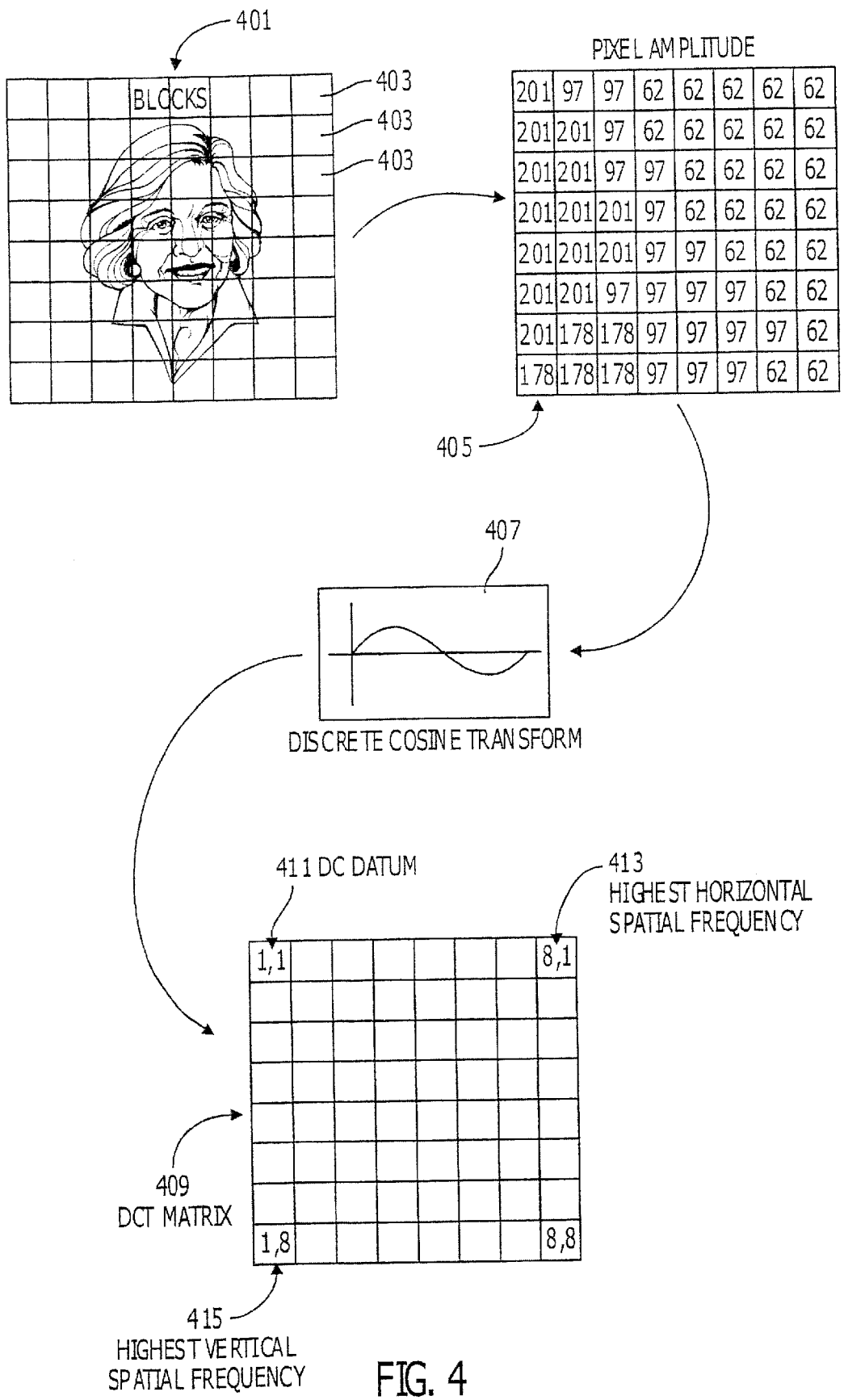
FIG. 4 is an illustration of a simplified block diagram Discrete Cosine Transform, in accordance with the principles of an embodiment of the present invention.

FIG. 4 is a simplified illustration of a DCT function. Video picture consists of one luminance and two chrominance components or frames 401 which are divided into blocks 403. Each of the blocks 403 is an 8×8 matrix of pixel values. The pixel values represent the amplitude of the signal, e.g., the luminance/chrominance portion of the signal. Each of the coefficients within the 8×8 matrix represents a value of the pixel amplitude at a corresponding position in one of the blocks 403. An example value 405 of magnitude 178 is illustrated in FIG. 4. The pixel amplitude matrix is then processed through a DCT function 407. The DCT function converts the pixel matrix into a DCT matrix. The DCT matrix is also an 8×8 matrix.

However, instead of merely pixel amplitudes, the elements of the DCT matrix are frequency components. FIG. 4 illustrates an exemplary DCT matrix 409. Within the 8×8 matrix, the top left position within the matrix, i.e., the "1" or "first" position is the DCT datum 411. This represents the average value of all the pixels in the block.

For example, at the far right of the first row, in the "8,1" position in the DCT matrix 409, resides the coefficient that represents the highest horizontal spatial frequency 413 contained within the block, and how much of that frequency is present. Likewise, the "1,8" position of the DCT matrix 409 represents the highest vertical spatial frequency 415 within the block.

Figure 5A:
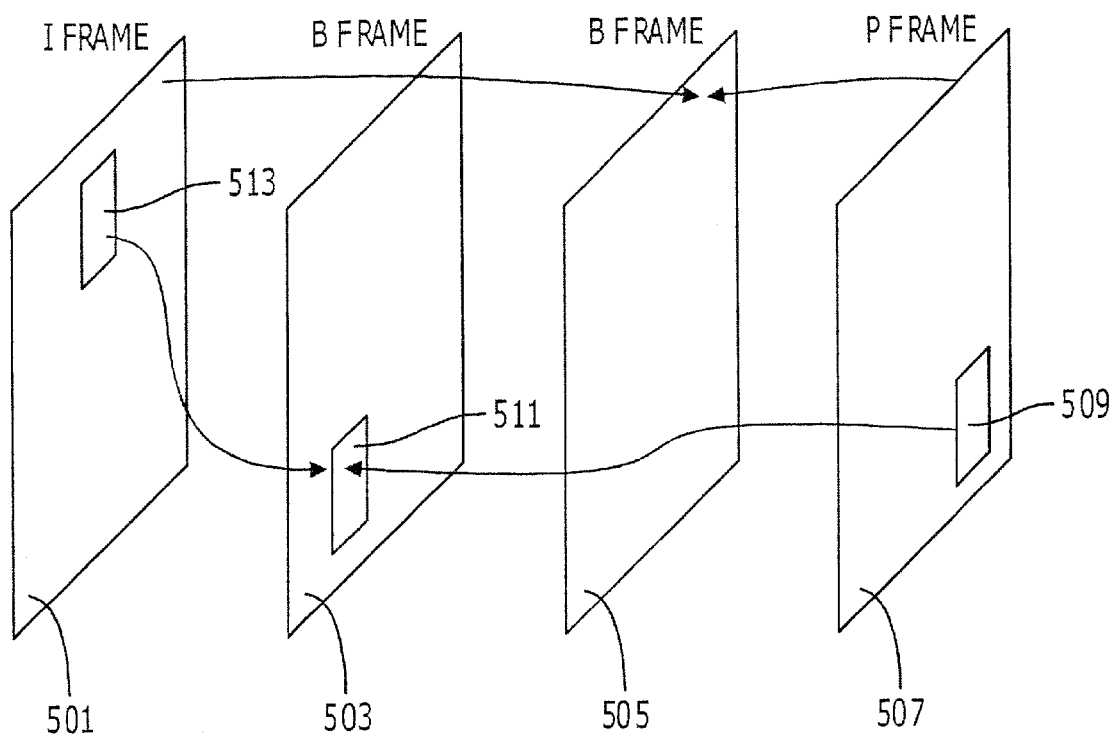
FIG. 5A illustrates a re-assembly technique of a video picture frame from an MPEG-2 I frame and P frame, in accordance with the principles of an embodiment of the present invention.

FIG. 5A illustrates the reassembly of a video picture frame from the MPEG-2 frames. There are three types of MPEG-2 frames. They are called the I frame, the B frame and the P frame.

An intra or "I" frame 501 is shown. The Index frame 501 is MPEG-2 data that contains full information regarding the picture. The Index frame 501 is referred to as an index frame because it is the starting point from which other frames are constructed.

Conventionally, I frames are transmitted approximately once every, e.g., twelve or fifteen frames. I frames are the least compressed frames, and they are the starting frames when the process of reconstructing video frames has an unrecoverable error and the starting frames in a new channel acquisition.

An example of two B frames 503, 505 are shown. B frames are also known as bidirectional predicted frames. These B frames 503, 505 have the most compression and they are constructed from past and future frames.

Figure 5B:
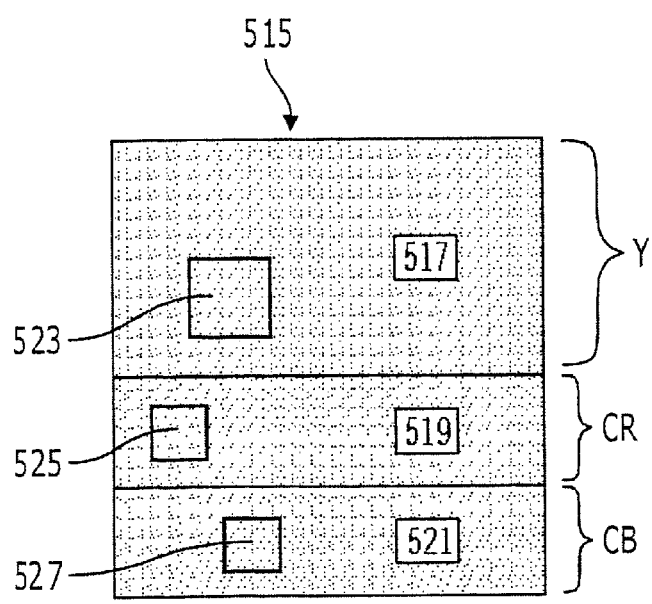
FIG. 5B illustrates an exemplary frame of a video that may be stored in a video frame memory, in accordance with the principles of an embodiment of the present invention.

An example of a P frame 507 is also shown in FIG. 5B. P frames are predicted frames, that are predicted from either past I frames or past P frames.

For example, in FIG. 5A, the macroblock is in a first position 513 in the I frame 501. Within the next B frame 503 the macroblock may move into a second position 511. Also, the macroblock may be predicted from a future P frame. For example, P frame 507 may have the same macroblock in a third position 509 and that macroblock will be projected into the B frame at the second position 511. In this way, the frames are constructed from past and future frames. This is done to provide a more efficient throughput, because there is often a high redundancy in picture information between frames.

Frames generally differ very little between each consecutive frame. For example, an average NTSC type picture comprises 60 fields (30 frames) per one second of video. Although a viewer may perceive motion on the television screen, it is due in large part to the persistence of the eye in perceiving minute changes between frames. This perception can be realized graphically within a VCR slow motion mode. If a VCR video is stepped one frame at a time in slow motion mode, the minor differences between successive frames can be seen, as well as the portions of the scene that may stay relatively unchanged between two frames.

FIG. 5B illustrates an MPEG-2 frame. For the sake of illustration, it will be assumed that it is an I frame, but the comments can also apply to a B frame or P frame. The storage of data within these exemplary frames is defined by the MPEG-2 specification for this example. However, when frames are received and stored in a video decoder, they may be stored in any type of format depending upon what is convenient for the application in question.

For example, a common method of storing video information from MPEG-2 frames is illustrated in FIG. 5B. FIG. 5B shows one complete video frame 515. The video frame 515 is divided into three discrete sections or portions 517, 519, 521. The first section 517 represents the Y or luminance component of the picture. The second section 519 represents the chrominance portion of the picture representing the color red. The third section 521 of the video frame 515 is also chrominance information. However, the third section 521 is representing the color blue.

Video is generally defined as having color and luminance components. The color components represent different colors. For example, red, green, and blue are often used as components within a picture tube. The Y component is the luminance component often referred to as the brightness component. It is only necessary to know three of the these four components because by knowing three of the four, the remaining one can be derived.

For example, if the R component, i.e., the red component, the G component, i.e., the green component, and the B component, i.e., the blue component, of the video are known, then the picture may be reconstructed. Here, the fourth component, i.e., the luminance or brightness portion of the picture, is reconstructed. Likewise, if for a first and second component, only the red and blue components are known, and for a third component the luminance or brightness portion of the picture is known, then the green component of the picture can be reconstructed.

In FIG. 5B, within frame 515 is a group of coefficients 523 which represent the macroblock in position 513. The corresponding component in the red chroma information is represented as 525. The corresponding component within the blue information within the frame 515 represents the blue information.

As can be seen from FIG. 5B, the position of these coefficients within the frame 515 is somewhat random. The chrominance portion 523 may be displaced within the block by a certain amount. Also, the color components can be displaced within the block by a similar amount, but this displacement is not proportional to the chrominance portion 523 displacement. This displacement occurs because the amount of compression can vary throughout the frame. Because the exact displacement of the macroblock within the frame 515 is not known, it may be necessary to examine each point within the frame until the necessary data for the macroblock is encountered.

This variable compression also can lead to another problem. This problem is that the actual amount of storage needed to represent the frame may not be constant. This can lead to uncertainty in searching for a particular DCT macroblock within the frame, for example, in order to reconstruct a B frame. Therefore, in any MPEG-2 datastream, the first frame will be an I frame, which may be then followed by several B frames, and a P frame.

As to the B frames, they are predicted from an I frame preceding it and a P frame following it. Alternatively, a B frame may be predicted from a P frame preceding the B frame and a P frame following the B frame. This gives rise to the requirement that at least two frames must be able to stored in memory, e.g., two MPEG-2 frames, in order to reconstruct any other MPEG-2 frame. This is required because of the way that the MPEG-2 frames are constructed, as is further described as follows.

Of course, the intra frame, or I frame, does not refer to any other frame. Therefore, an I frame needs no other frame in memory to reference it. If all MPEG-2 were I frames, then there would be no need for a video frame memory.

However, there are B frames and P frames within the MPEG-2 stream. For example, a P frame is predicted from an I frame. Therefore, a P frame must have an I frame within the video frame memory. Thus, if MPEG-2 data consisted only of I frames and P frames, all that would be necessary is a video frame memory to store the I frame. Also, then any P frame could be constructed from it.

Also, the B frame is the third frame within the MPEG-2 datastream. The B frame may be predicted from a previous frame, an I frame or P frame or from a following P frame. Therefore, to construct B frames, it is necessary to have the capability of storing two video frames in memory, a previous one and a future frame. Thus, MPEG-2 decoders must be able to store at least two video frames.

The two frame memories are required to contain one full video frame each, i.e., to contain the full uncompressed video frame.

By sizing each of the video frame memories, so that they each may contain an entire uncompressed video frame, we can assure that there is enough video frame memory to decode any MPEG-2 frames.

However, video frame memory comprises high speed memory. And even with the declining prices of this memory, this large amount of high speed memory can be very expensive. Therefore, it is a goal of many MPEG-2 video decoder designers to use as little of this high speed video frame memory as possible.

In order to reduce the cost of frame memory, one design tact that may be taken is to compress the MPEG-2 frames themselves, which are fitting into the frame memory. By merely compressing the two frames, there can be a saving of video frame memory. Also, compressing the video within the video frame memory can save high speed video memory, but can also lead to several difficulties.

The first difficulty is that there is no definitive length for the compressed video frames, or the video frame memories because it cannot be known, a priori, just how much any given frame will compress. The second problem arises when the compressed video within the video frame memories is attempted to be used. Because the video is compressed, a certain macroblock cannot be predicted to be present within the frame at any particular offset.

The offset of the macroblock within the frame depends upon the amount of compression of the frame. For example, if a frame is mainly random noise, very little compression is possible and any macroblock will be at a relatively far displacement into the video frame. However, if the scene is a scene into which a large amount of compression may be applied, this same macroblock may be located near the head, or front, of the video frame memory.

In addition, the encoding and decoding process must be simple enough so that it can be accomplished quickly, e.g., on the fly. This process must not be so complex so as to preclude the decoding of MPEG-2 in real time. If the encoding is too complex, it will be impossible to reconstruct the video from live MPEG-2 streams.

Figure 6:
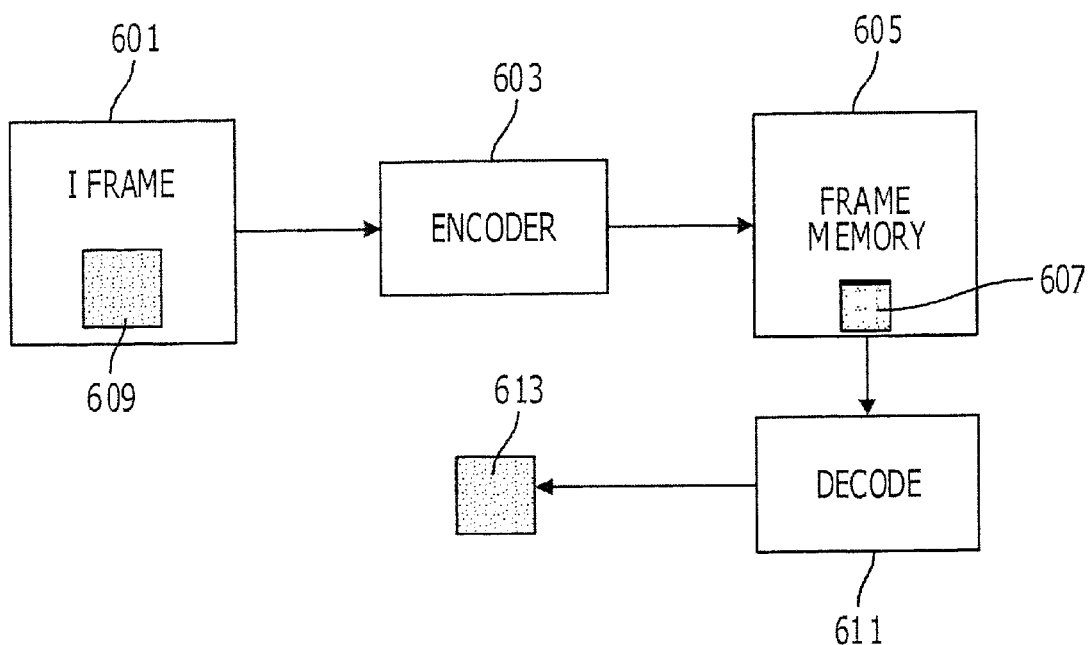
FIG. 6 is an illustration of a simplified block diagram of an MPEG-2 I frame exemplary encoding and compressing technique for storage in a video frame memory, in accordance with the principles of an embodiment of the present invention.

FIG. 6 is a block diagram of an I frame being encoded and compressed into frame memory. The entire I frame is coupled into an encoder 603 which compresses the data within the I frame and places it within frame memory. The area in the macroblock 609 has now been compressed and is represented by area 607 within the frame memory. Assuming that the macroblock needed is macroblock 609, the compressed version 607 of macroblock 609 can be accessed, and is contained within the frame memory 605 and decoded in a decoder 611. Then, the result of the decoding process is a macroblock 613.

The macroblock 613 can be a perfect copy of the macroblock 609. Alternatively, it may have some loss depending on the amount of compression that encoder 603 is introducing into the data within the I frame. For example, if a great amount of compression is desired, then the higher frequency components of macroblock 607 may be discarded. In this case, the resulting decoder block 613 will be a degraded version of the original macroblock 609. Although this scheme helps to reduce the amount of frame memory required, it still does not address the problem of finding the particular macroblock within the frame memory. Nor does it address the problem of actually sizing of frame memory.

Now, in combination with the above description of an MPEG-2 signal transmission process, the present invention may be more fully understood by the following description with relationship to FIGS. 7–9.

In one embodiment of the present invention, as shown in FIG. 7A(1), an MPEG-2 compressed bitstream 710 is supplied as an input to a signal decoder and converter 100. The signal decoder and converter 100 of FIG. 1B is illustrated with a dashed outline in FIG. 7A(1). However, in other embodiments of the present invention, various elements in portions that are shown within the decoder and converter 100 of FIG. 7A(1) may in fact be set apart from or eliminated from the decoder and converter 100. Further, although not shown, the decoder and converter 100 may also contain elements that are analogous to the elements described with respect to FIGS. 7–9, in various alternate embodiments of the present invention.

Generally, a variable-length/run-length decoder (VLD/RLD) 715, is shown, e.g., in FIG. 7A(1). However, while the VLD/RLD 715 may not necessarily be shown in all of the FIGS., it is understood that the VLD/RLD preferably comprises a portion of all of the embodiments illustrated by the following examples.

Specifically in FIG. 7A(1), a variable-length/run-length decoder (VLD/RLD) 715, is shown. The variable-length/run-length decoder (VLD/RLD) 715 receives the MPEG-2 compressed bitstream signal 710. The VLD/RLD then decodes the bitstream into coefficients and motion vectors. The motion vectors 765 are used to as pointers to retrieve macroblocks from specific areas of the previously decoded frames.

The coefficients are input to the inverse quantization, or $Q^{-1}$, device 720 then outputs the inverse quantized signal to the inverse DCT device 730. In this embodiment, that is represented in the spatial domain, next an inverse DCT operation is performed upon the signal. Then, the signal is stored in a frame buffer 750 and processed in a motion compensation device 760, utilizing a motion vector ("MV") technique to analyze and construct the video signal for output to the HDTV to SDTV resolution unit 740. The HDTV to SDTV resolution unit, by utilizing a spatial filter that is not shown, performs an approximate 4:1 conversion of the signal from an HDTV digital signal to an SDTV analog signal. The HDTV to SDTV resolution unit 740 then outputs, for example, an SDTV signal at a resolution of 640 ×480.

In FIG. 7A(1), the incoming HDTV signal arrives block by block, and each block, after decoding, is placed into the frame buffer 750. Then, for the next frame that arrives with motion information, a motion compensation technique is performed on a previous frame in the frame buffer memory. This motion compensation technique is utilized to predict the current frame using the previously decoded frame information so that only the difference between the current block and the previous frame or block need be obtained to update the video image signal.

The problem with this conventional spatial domain embodiment, as illustrated in FIG. 7A(1), is that the frame buffer memory 750 is required to be relatively large. The large size is required because the frame buffer 750 and the motion compensation device 760 are processing the signal when it is still in the high resolution form or HDTV. Thus, a significantly larger amount of frame buffer memory is required with this arrangement. However, as previously noted, this arrangement does provide for a higher quality output signal than the following conventional frequency domain arrangements as illustrated in FIGS. 7–8.

As to the filtering of the signal, as illustrated in FIGS. 7B(1) and 7B(2), for example, another technique for filtering by the HDTV to SDTV resolution unit 740 is to utilize a low pass filter.

In FIG. 7B(1), a signal with relatively low frequency components 780, 782, 784, and 786, along with relatively high frequency components 771, 773, 775, and 777 are shown. In utilizing a spatial low pass filtering technique, as shown in FIG. 7B(2) the relatively higher frequency components have been filtered out, or eliminated. Thus, the low frequency components 780, 782, 784, and 786 remain and comprise the reduced resolution signal to be output to the SDTV device. However, the relatively high frequency signals 771, 773, 775, and 777 have been eliminated and the signal now has zero values 781, 783, 785, and 787 in place of these previous high frequency values.

Now, in combination with the above description of an MPEG-2 signal transmission process, the present invention may be more fully understood by the following description with relationship to FIGS. 7–9.

In one embodiment of the present invention, as shown in FIG. 7A(1), an MPEG-2 compressed bitstream 710 is supplied as an input to a signal decoder and converter 100. The signal decoder and converter 100 of FIG. 1B is illustrated with a dashed outline in FIG. 7A(1). However, in other embodiments of the present invention, various elements in portions that are shown within the decoder and converter 100 of FIG. 7A(1) may in fact be set apart from or eliminated from the decoder and converter 100. Further, although not shown, the decoder and converter 100 may also contain elements that are analogous to the elements described with respect to FIGS. 7–9, in various alternate embodiments of the present invention.

Specifically, in FIG. 7A(1), an inverse quantizer 720 receives the MPEG-2 compressed bitstream signal 710. The inverse quantization, or $Q^{-1}$, device 720 then outputs the inverse quantized signal to the inverse DCT device 730. In this embodiment, that is represented in the spatial domain, next an inverse DCT operation is performed upon the signal. Then, the signal is stored in a frame buffer 750 and processed in a motion compensation device 760, utilizing a motion vector ("MV") technique to analyze and construct the video signal for output to the HDTV to SDTV resolution unit 740. The HDTV to SDTV resolution unit, by utilizing a spatial filter that is not shown, performs an approximate 2:1 conversion of the signal from an HDTV digital signal to an SDTV analog signal. The HDTV to SDTV resolution unit 740 then outputs, for example, an SDTV signal at a resolution of 640×480.

In FIG. 7A(1), the incoming HDTV signal arrives block by block, and each block, after decoding, is placed into the frame buffer 750. Then, for the next frame that arrives with motion information, a motion compensation technique is performed on a previous frame in the frame buffer memory. This motion compensation technique is utilized to predict the current frame using the previously decoded frame information so that only the difference between the current block and the previous frame or block need be obtained to update the video image signal.

The problem with this conventional spatial domain embodiment, as illustrated in FIG. 7A(1), is that the frame buffer memory 750 is required to be relatively large. The large size is required because the frame buffer 750 and the motion compensation device 760 are processing the signal when it is still in the high resolution form or HDTV. Thus, a significantly larger amount of frame buffer memory is required with this arrangement. However, as previously noted, this arrangement does provide for a higher quality output signal than the following conventional frequency domain arrangements as illustrated in FIGS. 7–8.

As to the filtering of the signal, as illustrated in FIGS. 7B(1) and 7B(2), for example, another technique for filtering by the HDTV to SDTV resolution unit 740 is to utilize a low pass filter.

In FIG. 7B(1), a signal with relatively high frequency components 780, 782, 784, 786, 771, 773, 775, and 777 are shown. In utilizing a spatial low pass filtering technique, as shown in FIG. 7B(2) the relatively higher frequency components have been filtered out, or eliminated. Then the filtered signal can be subsampled to obtain 780, 782, 784 and 786.

Figure 8A:
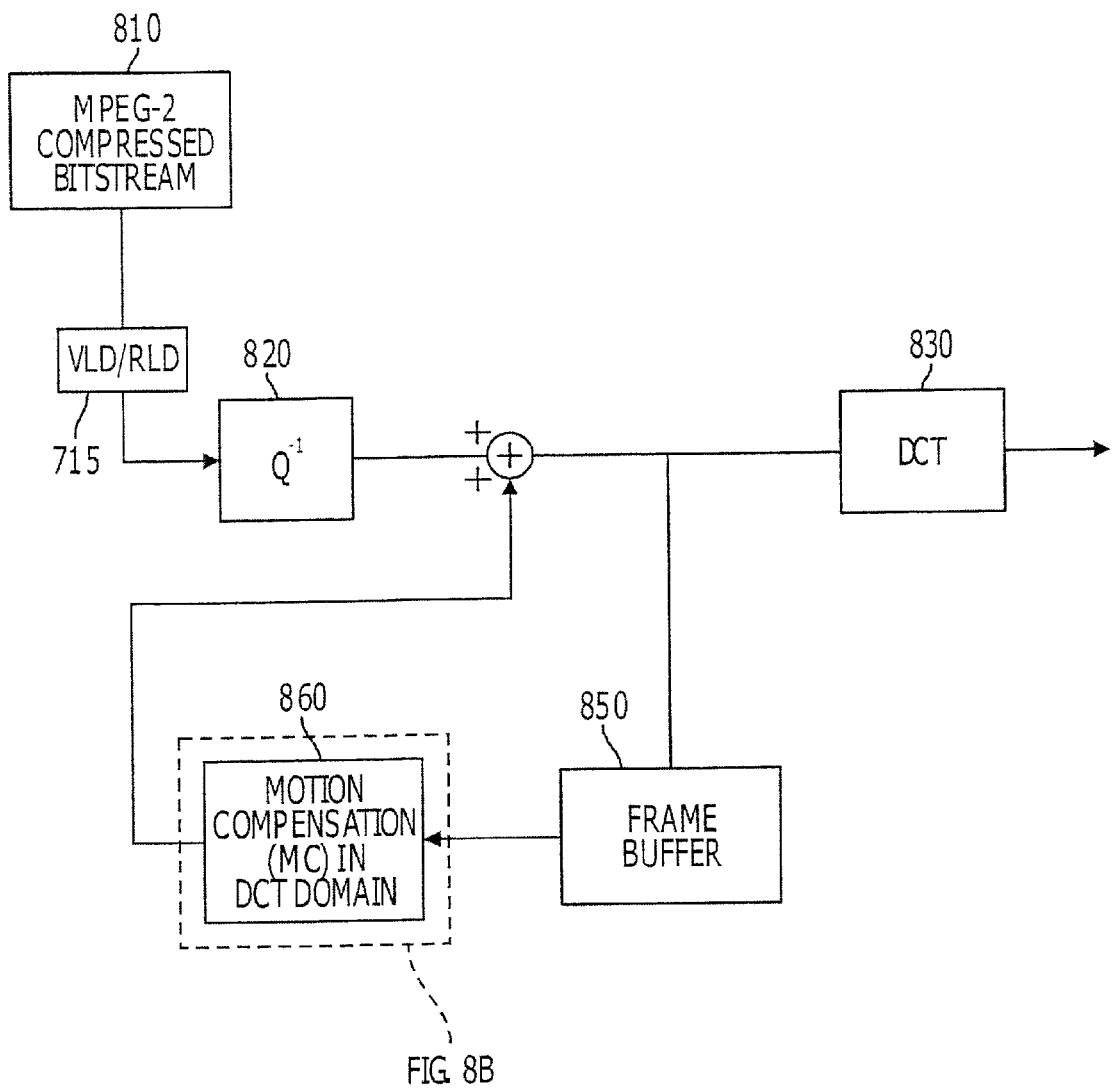
FIG. 8A is an illustration of an embodiment of a simplified video signal converter.

In contrast to the spatial domain arrangements, in yet another conventional arrangement, as shown in FIG. 8A, the MPEG-2 compressed bitstream signal 810 is again supplied to a inverse quantizer processor 820 prior to input to the frame buffer 850. Again, the individual frames of the signal are stored in the frame buffer 850 memory and a motion compensation is performed by a motion compensation ("MC") unit 860. However, in this case, the motion compensation is performed in a DCT domain device portion of the motion compensation unit 860. After the motion compensation process, the signal is forwarded to the DCT device 830 for conversion to a lower resolution signal, for output to a display.

Figure 8B:
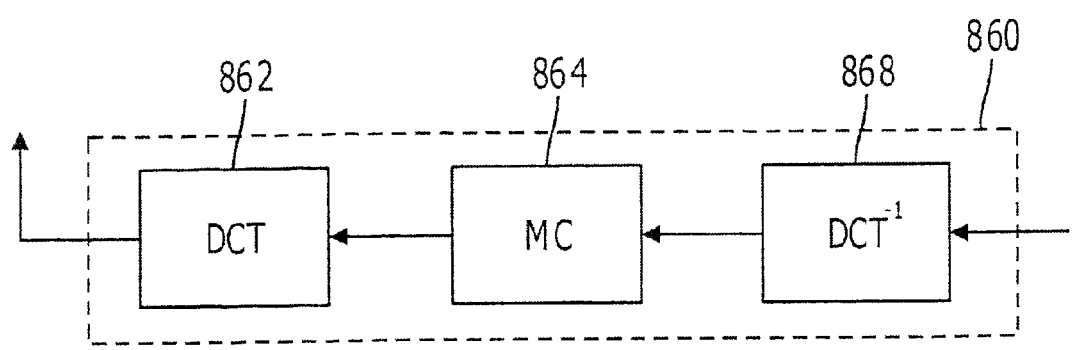
FIG. 8B illustrates a portion of the video signal converter, as illustrated in FIG. 8A.

In FIG. 8B, the motion compensation in the DCT domain device 860 is shown in more detail. The motion compensation in the DCT domain device portion of the motion compensation unit 860 comprises utilizing an inverse DCT 8×8 device upon the signal prior to performing a motion compensation by the motion compensation device 864. Then the motion compensation device 864 provides the signal to a DCT device 862 for processing, and then the signal may be provided to a DCT device 830, for processing for output.

Figure 8D:
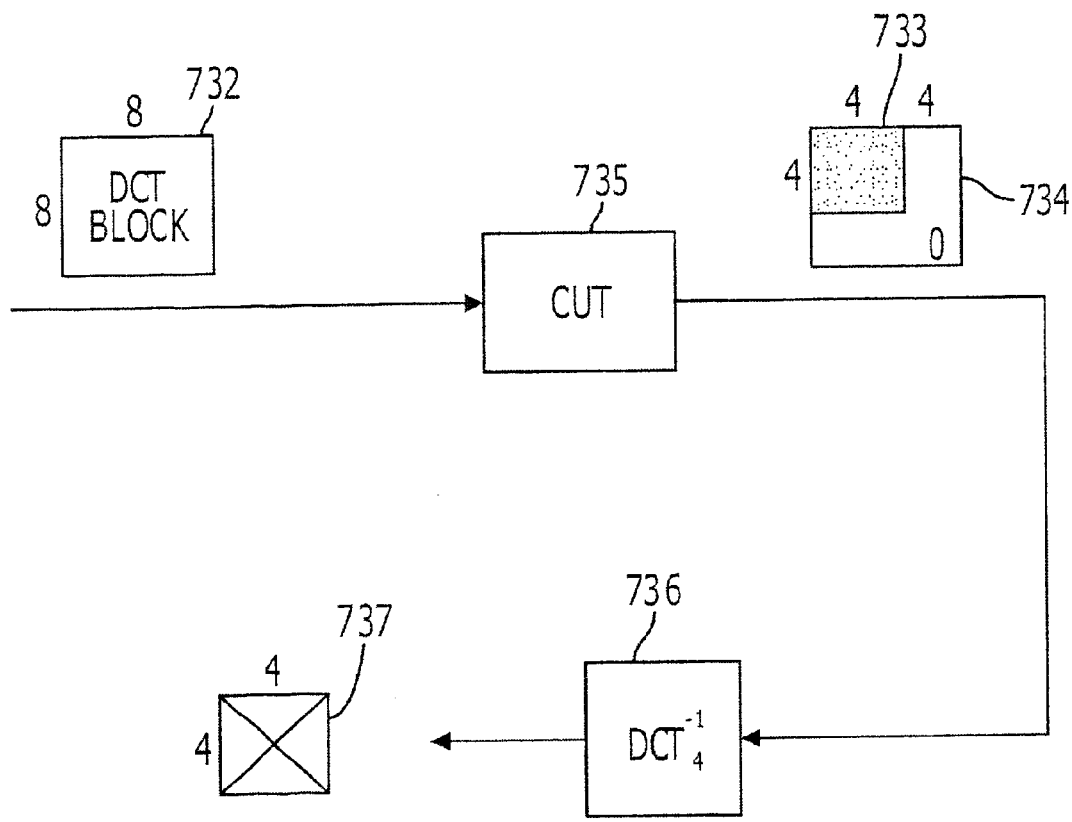
FIG. 8D illustrates a simplified block diagram of a frequency cut technique.

It will be understood, by one skilled in the art, that either a frequency cut or a frequency synthesis may be utilized to reduce the resolution of a signal. In FIG. 8D, a frequency cut that may be utilized with either the inverse DCT of FIG. 7A(2) or the arrangement as shown in FIG. 8A is illustrated. In FIG. 8D, an 8×8 DCT block 732 is passed through a frequency cut device 735. The frequency cut device essentially operates on the signal in a mathematical matrix format. The matrix DCT block 732, after frequency cutting, is shown as the 4×4 block 733. In a frequency cut, the 4×4 frequency cut block 733 comprises the upper left quadrant of coefficients of the 8×8 DCT block 732. The remaining coefficients in the three remaining quadrants in the remaining block 734 are discarded. Then, the reduced resolution frequency cut block 733 is processed by a 4×4 inverse DCT device 736. This results in an output of a reduced resolution 4×4 block 737 in the DCT domain.

As noted previously, either alternatively or in addition to the above frequency cut, a frequency synthesis may be conventionally performed. As shown in FIG. 8E(1), the frequency synthesis device 838 of FIG. 8C is illustrated. It will be understood that the frequency synthesis technique of FIGS. 8E(1)–(3) may be utilized with either the arrangements of FIG. 7A(2) and/or FIG. 8A that utilized the DCT domain for resolution conversion and reduction.

In FIG. 8E(1), a 16×16 video signal block in DCT domain 880 is prepared for a frequency synthesis operation by the frequency synthesis device 838. The 16×16 block 880 consists of four 8×8 blocks which are block A 881, block B 882, block C 883, and block D 884 that are in a DCT domain. In a mathematical arrangement, the frequency synthesis is performing an 8×16 matrix operation. Upon processing the video block 880 through the frequency synthesis device 838, a resulting block e 886 of size 8×8 is produced in the spatial domain.

The frequency synthesis technique is shown in further detail in FIG. 8E(3). In FIG. 8E(3), each of the 8×8 blocks A-D 881–884, are then equivalently processed by an inverse DCT device 890 and then reassembled into a modified matrix. The modified matrix block 880m comprises the processed signal at this point. The block A 881 is then inverse discrete cosine transformed into block "a" 881a. Analogously, block B 882, block C 883, and block D 884, are also inverse discrete cosine transformed into block b 882b, block c 883c, and block d 884d, respectively. Then, the modified block 880m is discrete cosine transformed by a DCT device 892 so as to process the modified block 880m into a matrix block E 886. Block E 886 is then frequency cut wherein the upper left quadrant matrix 733A, that is size 8×8, is frequency cut from the processed block E 886e and the remaining coefficients in the remaining quadrants are discarded. The 8×8 frequency cut block 733A is produced by a frequency cut device 735A. The cut block 733A is then inverse discrete cosine transformed by the inverse DCT device 736A so as to output a reduced resolution signal block e 737e of size 8×8. This signal is then output for display on a lower resolution device.

The above detailed description with respect to FIGS. 7–8 comprise the conventional techniques for downsampling or converting an MPEG-2 HDTV type signal to a SDTV analog signal for display. An overview of some embodiments of the present invention are next illustrated in FIGS. 9A–9B.

Figure 9A:
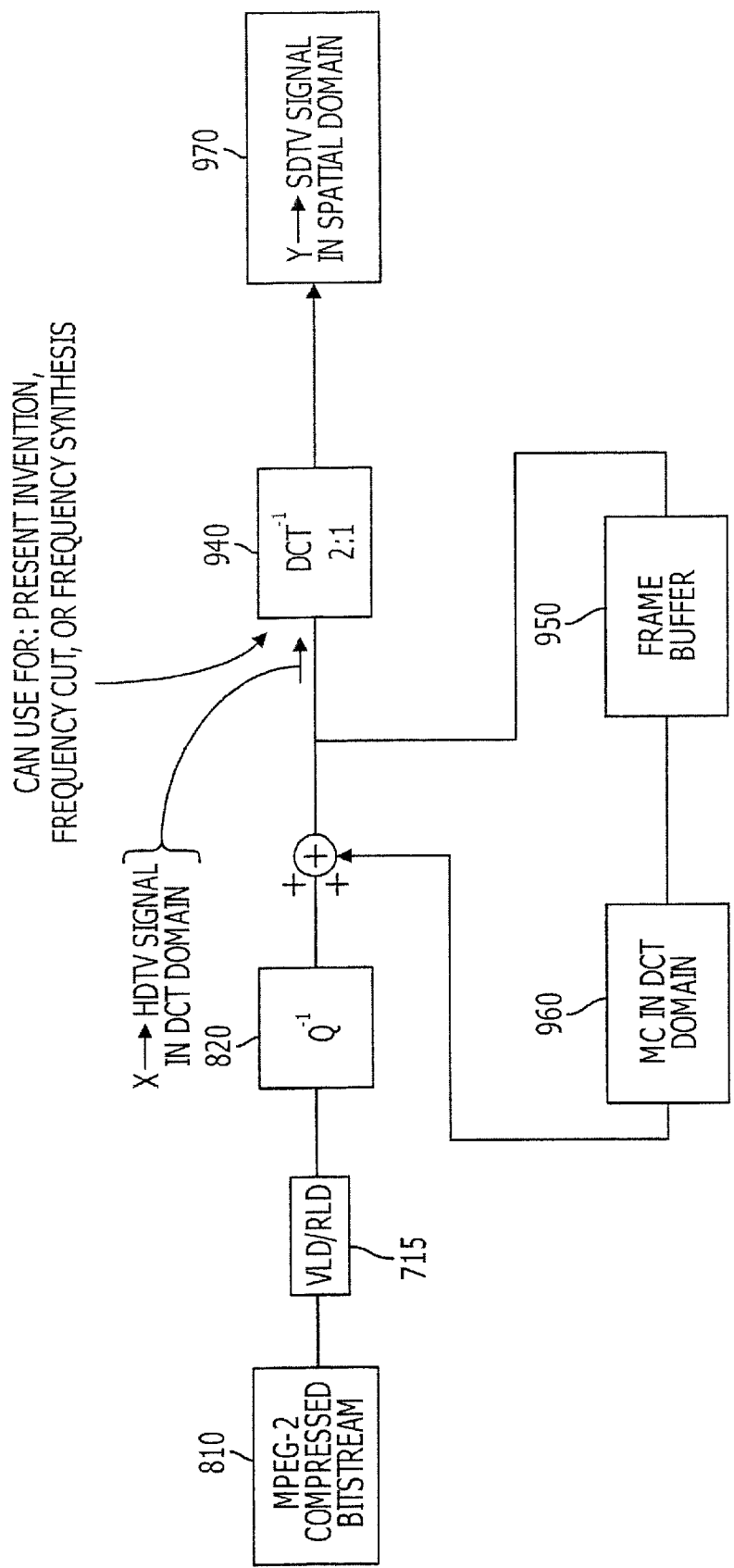
FIG. 9A is an illustration of a simplified block diagram of a video signal converter, in accordance with the principles of an embodiment of the present invention.
Figure 9B:
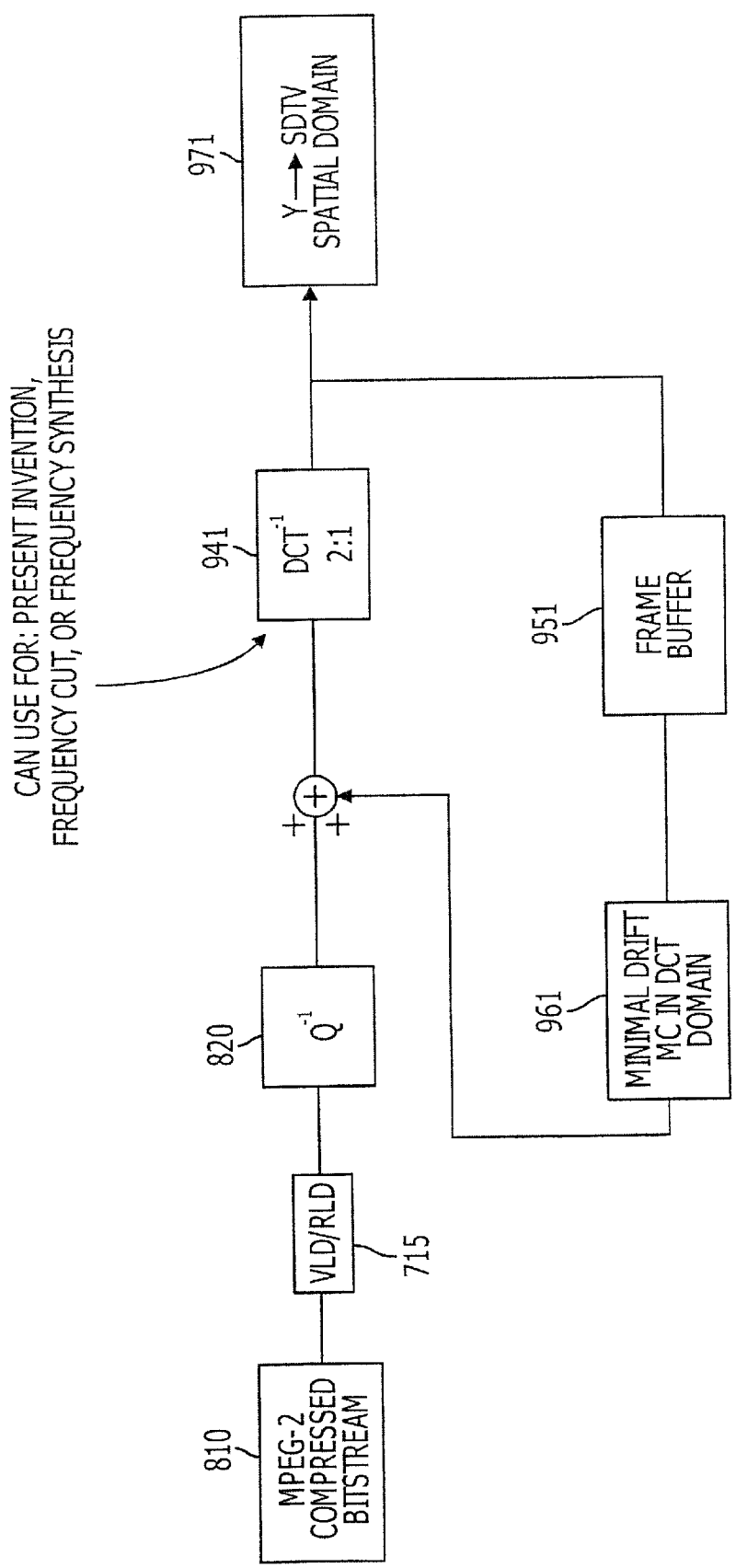
FIG. 9B is an illustration of a simplified block diagram of yet another video signal converter, in accordance with the principles of an embodiment of the present invention.
Figure 10:
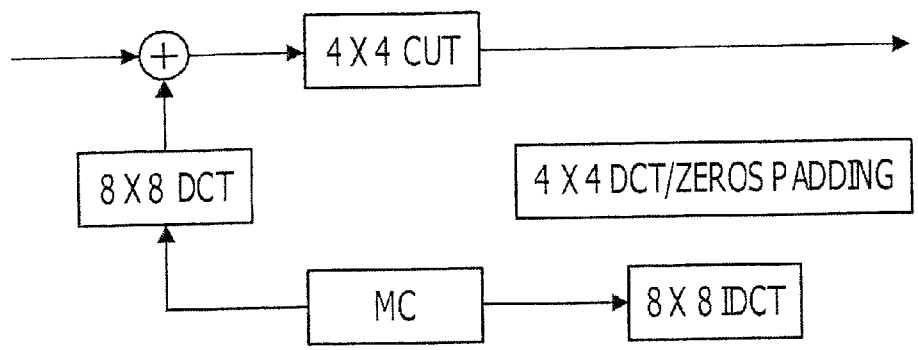
FIG. 10 is a block diagram illustrating a Minimal Drift Motion Compensation for 4×4 frequency cut method in accordance with the principles of an embodiment of the present invention.
Figure 16:
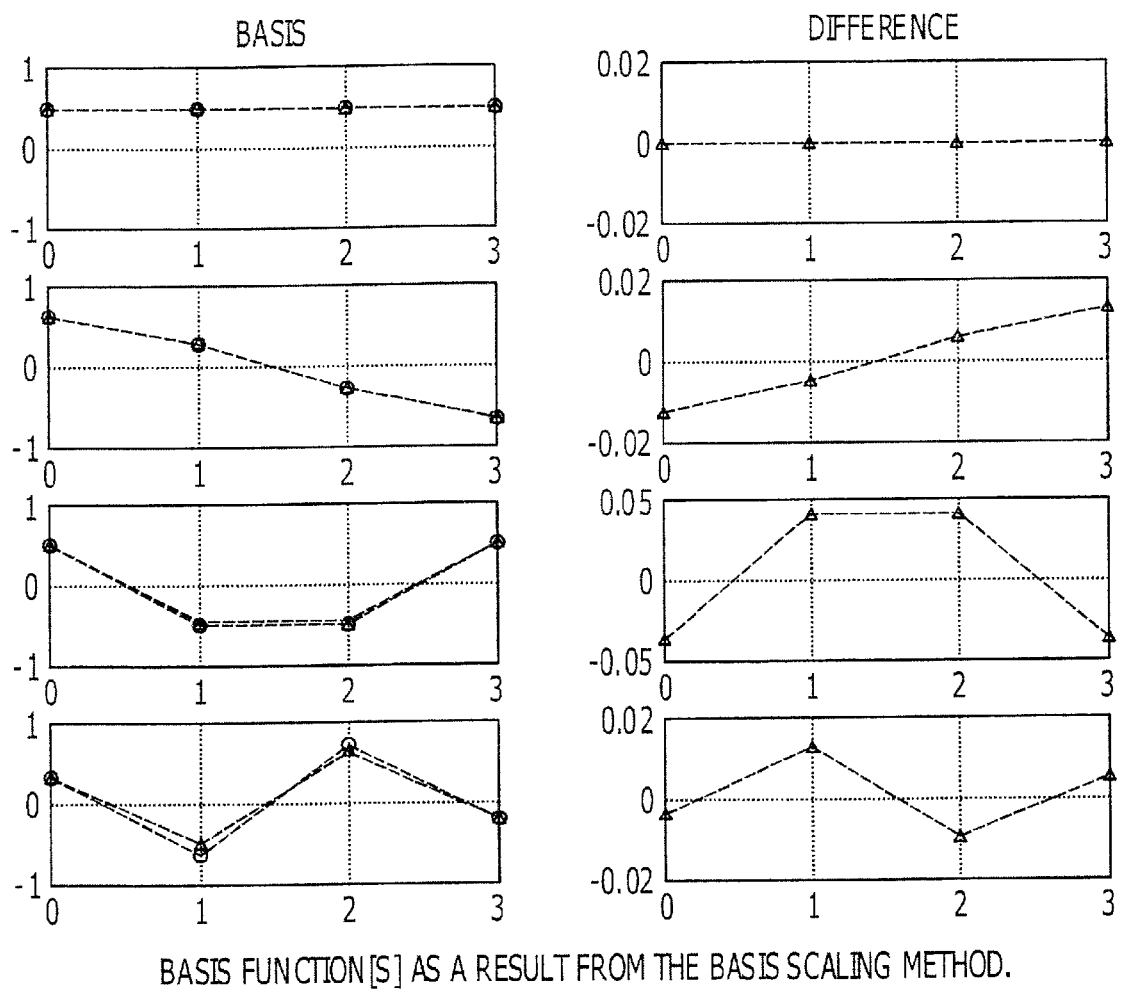
FIG. 16 is an illustration of exemplary basis functions resulting from the basis scaling method, in accordance with the principles of an embodiment of the present invention.

Also, FIG. 9A may be utilized as an open-loop reduced resolution decoder. It is high in both complexity and memory. FIG. 9B represents a minimal drift motion compensation algorithm which can be implemented in various ways with respect to memory or complexity criteria. However, either arrangement may be configured to utilize embodiments of the present invention, as will be understood from the following description.

The following detailed description of various exemplary embodiments of the present invention utilize the MPEG-2 compressed bitstream signal 810 of FIGS. 9A–B. Further, the video data is preferably processed in a two dimensional mathematical matrix form.

As will be understood by one skilled in the art, a conventional resolution reduction for a frequency cut technique in the DCT domain may be represented by the following:

$$D_4^{-1}[I_4 0_4]X\begin{bmatrix}I_4\\0_4\end{bmatrix}D_4 \quad \text{(Equation 100; prior art)}$$

where $D_4^{-1}$
   represents a $DCT_4^{-1}$, or in other words, an inverse discrete cosine transform of size 4×4.

In the practice of the present invention, experimental attempts were made to map the filtering process of the spatial domain onto the DCT domain process. After a number of experimental attempts were performed, a rather surprising development occurred.

First, a diagonal matrix was substituted for the identity matrix, that in this example is represented as $I_4$ in the above equation 100. The diagonal matrix was used with the data obtained from the upper left-hand quadrant portion of the matrix. Thus, an embodiment was discovered where the mapping could be accomplished while reducing at least one of a frame buffer memory size and a computational complexity, providing a reduced resolution signal for output to a display. However, other experimental efforts were explored and an even more surprising result was discovered, that comprises a preferred embodiment of the present invention.

This preferred embodiment of the present invention comprises utilizing a minimization of the predetermined values that comprise at least a portion of the diagonal matrix. These values are minimized to a predetermined threshold value "T." The threshold value T is selected based upon, e.g., the output display quality desired by the user. These diagonal matrix values are preferably minimized utilizing basis functions.

When these minimized values are utilized with the diagonal matrix, so that the diagonal matrix is substituted for the identity matrix, an improved video signal is obtained for output to a display. Further, as is set forth in greater detail below, the video quality is often as good as or better than the prior art, while at the same time reducing at least one of the memory and/or the computational complexity requirements.

More specifically, the identity matrix $I_4$ of Equation 100 above, or more generically, $I_N$, is considered where:

$$I_N = \begin{bmatrix} 1 & & & & 0 \\ & 1 & & & \\ & & 1 & & \\ & & & \ddots & \\ 0 & & & & 1 \end{bmatrix} \Big\} N \text{ rows} \quad \text{Equation 104}$$

$$\underbrace{\hspace{3cm}}_{N \text{ columns}}$$

But, instead of using $I_4$, the above identity matrix represented as Equation 104 is replaced, within the DCT domain, by a diagonal matrix "B" that, in a generic sense, may be represented by:

$$B = \begin{bmatrix} b_1 & & & 0 \\ & b_2 & & \\ & & b_3 & \\ 0 & & & b_4 \end{bmatrix} \quad \text{Equation 105}$$

where the values $b_1, b_2, \ldots b_n$, are predetermined values that are preferably less than a threshold value T, that are obtained from the exemplary minimization technique described later.

Thus, for example, a spatial domain Equation 100 above may be represented in an equivalent form as:

$$D_4^t[I_4 0_4]D_8 \times D_8^t \begin{bmatrix} I_4 \\ 0_4 \end{bmatrix} D_4 \quad \text{(Equation 101, prior art)}$$

where Equation 101 is equivalent to Equation 100, as is understood by one skilled in the art. For example, in the spatial domain, the expression $D_8 \times D_8^t$ of Equation 101 is equivalent to the expression X of Equation 100.

In this example, $I_4$ is replaced with $B_4$, and with the minimizing technique described in detail below, the following approximation may be realized:

$$[B_4 O_4] D_8 S_{2:1} \approx D_4 \qquad \text{Equation 107}$$

In order to realize the above approximation recited in equation 107, B must be minimized to an acceptable value that is preferably defined to be less than a threshold value T. For example, B may be generally understood to be minimized as:

$$\min_{B_4} \left\| D_4 - [B_4 O_4] D_8 S_{2:1} \right\|_2 \qquad \text{(Equation 121)}$$

where $D_8 S_{2:1}$ may be represented as $\tilde{D}_8$.

A relationship is utilized to minimize over the matrix B. For example, a matrix that comprises a basis function where each row represents one basis, and the next row represents another basis, for eight rows, may be illustrated as follows:

$$D_8 S_{2:1} = 8 \left\{ \begin{bmatrix} x & x & x & x \\ x & x & x & x \\ x & x & x & x \\ x & x & x & x \\ x & x & x & x \\ x & x & x & x \\ x & x & x & x \\ x & x & x & x \end{bmatrix}^4 = \tilde{D}_8 \right. \qquad \text{(Equation 109)}$$

where it should be noted that, in this matrix relationship, every other column is left blank because the subsampling occurs by 2, when you multiply the matrixes to the right. This is because subsampling of the basis functions results in a zero in every other column for all eight rows. In the preferred practice of the present invention, the zeros are discarded and the matrix is converted to a 8×4 size matrix, where the matrix comprises eight rows and four columns.

If the matrix $\tilde{D}_8$ can be written as:

$$\tilde{D}_8 = \begin{bmatrix} \tilde{D}'_8 \\ \tilde{D}''_8 \end{bmatrix} \qquad \text{Equation 109a}$$

Then after the left multiplication by the B matrix, the result is:

$$[B \; O] \tilde{D}_8 = B \tilde{D}_8 \to 4 \times 4 \text{ matrix} \qquad \text{Equation 109}a$$

where this matrix is represented as a 4×4 matrix because of the cancellations due to the various zero coefficients.

It will be understood by one skilled in the art, that the above approximation, or optimization, of $B_4$ is preferably achieved by repetitive or multiple iterations, but may also be obtained by any conventional minimization or optimization techniques, as desired.

It is thus understood that in the practice of the present invention; that for a frequency cut in a DCT domain embodiment, the following relationship is preferred:

$$D_4^{-1} [B_4 O_4] X \begin{bmatrix} B_4 \\ O_4 \end{bmatrix} D_4 \qquad \text{(Equation 200)}$$

Again, a diagonal matrix $B_4$ is substituted for the identity matrix $I_4$. Also, it is understood that the expression $O_4$ represents a zero matrix of size 4×4.

The present invention is also applicable for embodiments utilizing a frequency synthesis in the DCT domain.

For example, for a conventional frequency synthesis the following equation is utilized:

$$D_8^{-1} [I_8 O_8] M \begin{bmatrix} A & B \\ C & D \end{bmatrix} M^t \begin{bmatrix} I_8 \\ O_8 \end{bmatrix} D_8 \qquad \text{(prior art) Equation 140}$$

where each of expressions A, B, C, and D represent an 8×8 matrix, and where, $$D_8^{-1} [I_8 O_8] M \begin{bmatrix} A & B \\ C & D \end{bmatrix}$$

may be denoted as, and is equivalent to $$S \begin{bmatrix} A & B \\ C & D \end{bmatrix}$$

and where $$M^t \begin{bmatrix} I_8 \\ O_8 \end{bmatrix} D_8$$

may be denoted as, and is equivalent to $S^t$ where $S^t$ represents the transposition of S.

Analogously to the frequency cut, for the frequency synthesis embodiment, a Diagonal matrix $B_8$ is substituted for the identity matrix $I_8$, as follows:

$$D_8^{-1} [B_8 O_8] M \begin{bmatrix} A & B \\ C & D \end{bmatrix} M^t \begin{bmatrix} B_8 \\ O_8 \end{bmatrix} D_8 \qquad \text{(Equation 201)}$$

where the above Equation 201 is yet another embodiment of the present invention and where $$M = D_{16} \begin{bmatrix} D_8^t & O_8 \\ O_8 & D_8^t \end{bmatrix} \qquad \text{Equation 155}$$

and where the expression $O_8$ represents a zero matrix of size 8×8.

In this embodiment, $B_8$ preferably satisfies the following criteria $$[B_8 O_8] D_{16} S_{2:1} \approx D_8 \qquad \text{Equation 152}$$

and a minimization is predetermined, such that:

$$\min_{B_4} \left\| D_8 - [B_8 O_8] D_{16} S_{2:1} \right\|_2 \qquad \text{Equation 153}$$

Now, in more detail, one example of how to achieve the above optimization is described. In one preferred optimization, the following optimization steps are performed to minimize the cost function J(B) which could be equation 121 or 153:

(1) First, set $n=0$, and then set $i=1$, and (2) next, initialize $B^n \to I$ \qquad Equation 160 where I is an identity matrix, and $$B^n = \begin{bmatrix} b_1^n & & & 0 \\ & b_2^n & & \\ & & b_3^n & \\ 0 & & & b_4^n \end{bmatrix} \quad \text{Equation 161}$$

(3) then, compute $J(B^n)$ (4) then, compute $J(B^n + \Delta_i)$  Equation 162 where i=1, 2, . . . n, and for this example n=4, and $$(5) \quad \frac{\partial J}{\partial B} \approx \frac{J(B^n + \Delta) - J(B^n)}{\Delta} \quad \text{Equation 163}$$

and then $$(6) \quad b_i^1 = b_i^n - \varepsilon \frac{J(B^n + \Delta_i) - J(B^n)}{\Delta_i} \quad \text{Equation 164}$$

where $\varepsilon$ represents an incremental step, or change, in a value in the iteration.

(7) Now, set i=i+1 and repeat, by starting at step (4) above, until i=4.

(8) Then, set n=n+1 and reset i=1, and repeat again, beginning at step (3) above.

Note: iterate for each of the four ($b_1$, $b_2$, $b_3$, $b_4$) values and then reset i; where i=i+1 and do all four again.

(9) Then, if $J(B^n + \Delta_i) - J(B^n) < T$  Equation 168 for all i, and then for all n, then end.

Here, T is equal to a predetermined threshold value that is adequately small so as to provide a good quality output video signal for display.

Upon solving further values that are less than T, then assume $B^n$ is equal to B.

Any additional steps in the practice of a preferred embodiment of the instant invention are not shown for clarity.

Now, in order to more fully understand some of the various embodiments of the present invention, the following detailed discussion is set forth, that includes specific exemplary embodiments.

There are two factors involved in the implementation of minimal drift reduced size HDTV decoder. The first factor concerns how much memory is sufficient for buffering while remaining cost effective. The second factor concerns the level of computational complexity that is sufficient, so as to provide an adequate real-time display. Furthermore, the memory and the complexity themselves are inversely related.

The Fourier transform of the basis scaling resulting cover frequency, from O to π, is shown in FIG. 17, along with the results of the DFT and the DTFT optimization. FIG. 19 indicates a better image quality as a result of this basis scaling method. FIG. 17 also shows a Fourier transform of each row of an equivalent filtering matrix of the various methods described above.

Now, a description of the minimal drift motion compensation is provided.

It is clear that the visual quality of the basis scaling method still suffers from the motion drift, because nothing has been done to reduce the drift except using the quarter-pel motion compensation. Therefore, the associated minimal drift motion compensation for the 4×4 frequency cut method is also implemented to reduce the drift.

For this arrangement, the first drawback encountered is the speed of the decoder, because for every macroblock in an RRD reference frame, the enlargement (DCT4×4+zero padding+IDCT8×8) must be performed. However, all three steps have been simplified into one fast algorithm that requires computation as shown in FIG. 11. There are several practical ways to implement the minimal drift algorithm, with tradeoffs being made between memory size and computational power. In the following exemplary embodiments, two alternate cases have been implemented. The first case is a relatively low memory size and a relatively high computational power, that is denoted as "lm." In contrast, the second case has a relatively low computational power and a relatively high memory size, or requirement, that is denoted as "lc." The specific details of each case are described later.

The results in terms of MSE are shown in FIG. 19. It can be seen that the MSE is reduced significantly as compared to the original 4×4 frequency cut. In terms of perceptual quality, the minimal drift algorithm provides a much better result than even the basis shaping method. For example, blurred edges, as a consequence of motion drift are significantly sharpened.

In order to find how much improvement the minimal drift motion compensation algorithm can provide, another embodiment with a full resolution decoder may be examined. This full resolution decoder uses the frequency cut method (DCT8+ cut + IDCT4) at the FRD decoder output, i.e., similar to the open-loop method, except that the filter-subsampling is replaced with a frequency cut.

The results of this open-loop frequency cut are also shown in FIG. 19. It should be noted that computing the MSE of the open-loop frequency cut from the original with the MPEG-2 recommended filtering may be misleading. However, without drift, even the open-loop has less MSE than the open-loop frequency cut, but visually, the open-loop frequency cut appears much better, e.g., sharper. It may also be noted that the MSE results of the minimal drift algorithm of some sequences are even lower than that of the open-loop frequency cut.

As described earlier, comparison with the open-loop method is misleading. Therefore, the original frequency cut and the minimal drift algorithm is compared with the open-loop frequency cut to see the improvement as shown in the last two rows of FIG. 19. Theoretically, both the Im and the Ic method should provide the same result. However, slightly different results are illustrated, because of round-off errors.

Figure 18:
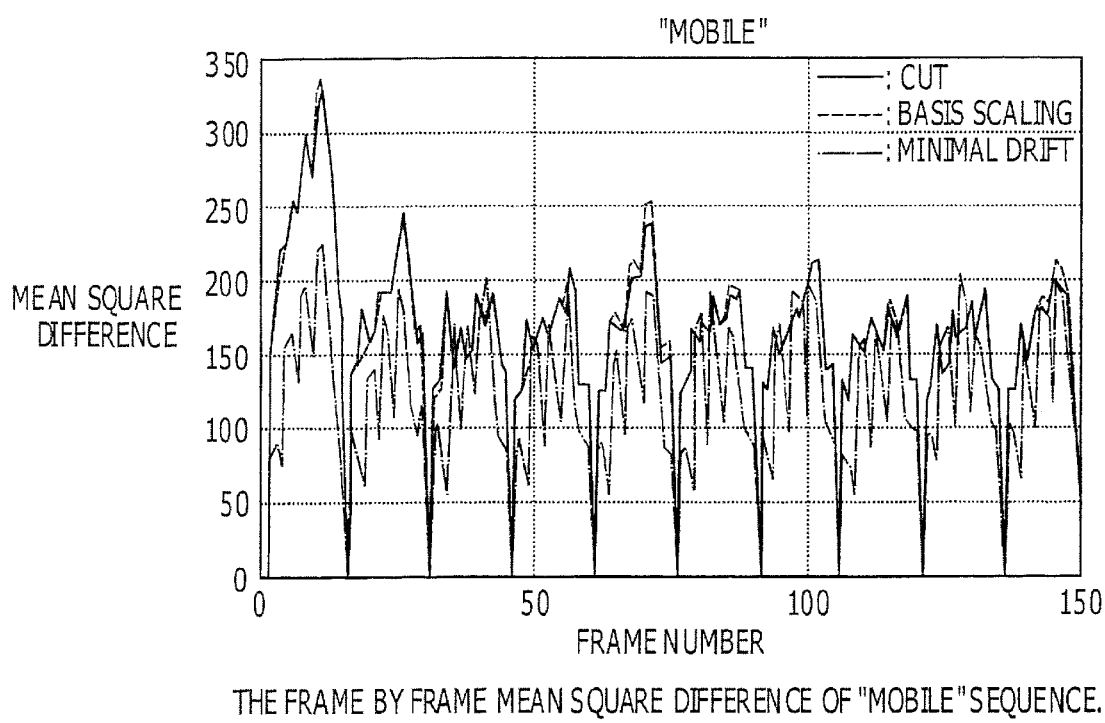
FIG. 18 is an illustration of an exemplary frame by frame mean square difference of "mobile" sequences, in accordance with the principles of an embodiment of the present invention.
Figure 21:
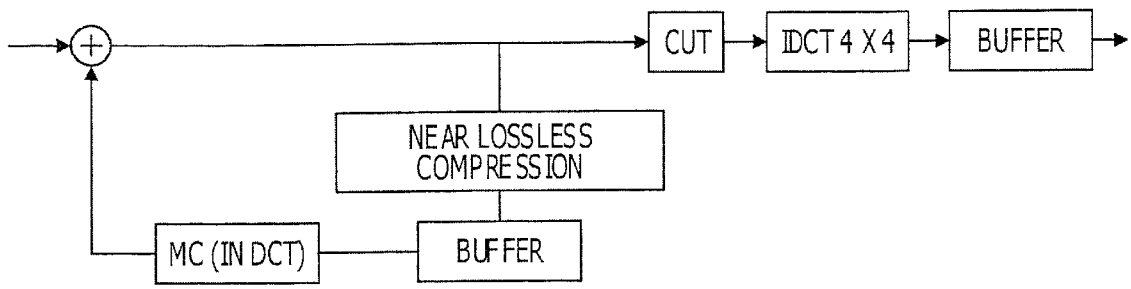
FIG. 21 is an illustration of an exemplary lossless compression of reference frames for motion compensation, in accordance with the principles of an embodiment of the present invention.
Figure 23:
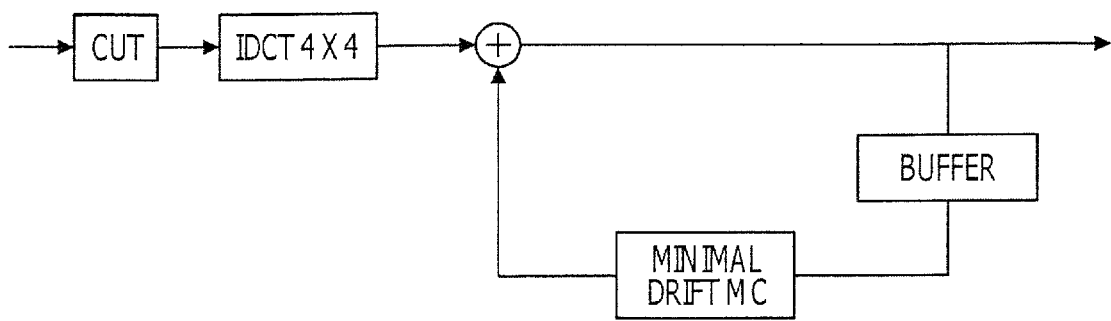
FIG. 23 is an illustration of an exemplary frequency cut with minimal drift MC flow chart, in accordance with the principles of an embodiment of the present invention.

The result of adding the minimal drift algorithm to the normal frequency cut improvement, as compared to the normal frequency cut and basis scaling method, is shown in FIG. 18. The mean square difference is obtained by comparison with the frequency cut open-loop result, i.e., the frequency cut of the FRD decoded video.

Now, an IDCT after prediction is considered. An alternative implementation of the Ic method is available in which the predicted area is DCT transformed and added with the residue block in the DCT domain before the frequency cut method is performed. According to FIG. 19, a slightly better result appears from the floating point rounding error reduction, due to the combined operations.

Also, the reuse of the discarded high DCT coefficients is described. Thus, in addition, an alternate arrangement option is implemented in which the high frequency DCT coefficients are discarded by a frequency cut method and are then stored and used to enlarge the reference frame in the MC loop. In other words, instead of "padding" with zeros, a 4×4 DCT block is "padded" with these high DCTs. As shown in FIG. 19, the result approaches the open-loop frequency cut method. However, unlike the lc algorithm in which the high DCTs can be immediately reused to generate an enlarged frame and thus result in no need of extra memory space, the lm algorithm needs extra memory space to store these high DCTs and make it readily accessible when a corresponding reference block needs to be enlarged. Compression can be used to reduce this memory space.

In yet another alternate arrangement, only one third of the high DCTs are "padded." The division follows a horizontal-vertical subband-like position in the DCT domain, i.e., a high-low, low-high, and high-high DCT. The DCT with the highest sum of absolute DCT coefficients is chosen to be padded. It is virtually equivalent to a ⅔ reduction in memory, without compression, for high DCTs but with a small memory indicating which subband to be used. The results shown in FIG. 19 are quite good, because they approach the open-loop frequency cut very quickly.

As to various experimental results, a summary of results from all of the techniques described above is shown in Tables 2 and 3. By default, the results shown in Tables 2 and 3 are the mean square difference to the original uncoded sequence with the MPEG-2 filter and subsampling.

The invention has been described in reference to particular embodiments as set forth above. However, only the preferred embodiment of the present invention, but a few examples of its versatility are shown and described in the present disclosure. It is to be understood that the present invention is capable of use in various other combinations and environments, and is capable of changes or modifications within the scope of the inventive concept as expressed herein. Also, many modifications and alternatives will become apparent to one of skill in the art without departing from the principles of the invention as defined by the appended claims.

The foregoing description of embodiments of the present invention are described for the purpose of illustration and description of aspects of the invention. It is not intended to limit the invention to the implementations described. The embodiments described are not exhaustive in providing a description of the form and substance of the invention and variations, modifications, and implementations are possible in light of the preceding teachings. It is intended that the invention not be limited by the foregoing description, but instead by the claims appended below.

What is claimed is:

1. A method for converting a higher resolution signal to a lower resolution signal, comprising the steps of:

performing a frequency cut operation on a first signal, performing a frequency synthesis operation on the results of the frequency cut step, adding a diagonal matrix to the results of the frequency synthesis step, wherein the diagonal matrix is substituted for an identity matrix, generating a second signal from at least a portion of the first signal, wherein the second signal comprises a result of the adding step, and wherein the second signal has a resolution that is lower than the first signal.

2. A method for converting a higher resolution signal to a lower resolution signal, comprising the steps of:

processing a first signal so as to place the first signal within a discrete cosine transform domain, performing a frequency cut operation on the first signal, adding a diagonal matrix to the results of the frequency synthesis step, wherein the diagonal matrix is substituted for an identity matrix, generating a second signal from at least a portion of the first signal, wherein the second signal comprises a result of the adding step, and wherein the second signal has a resolution that is lower than the first signal.

3. A method as recited in claim 1, wherein the conversion from the first signal to the second signal comprises a down conversion operation.

4. A method as recited in claim 2, wherein the conversion from the first signal to a second signal comprises a down conversion operation.

5. A method for converting a higher resolution signal to a lower resolution signal, comprising the steps of:

processing a first signal so as to place the first signal within a discrete cosine transform domain, performing an inverse discrete cosine transform upon the first signal by utilizing a diagonal matrix, within the discrete cosine transform domain, generating a second signal from at least a portion of the first signal, wherein the second signal has a resolution that is lower than the first signal, wherein the first signal, after placement within the discrete cosine transform domain, comprises a plurality of data in mathematical matrix form, and premultiplying a data matrix with the diagonal matrix, post multiplying the data matrix with the diagonal matrix.

6. A method as recited in claim 5, wherein performing the inverse discrete cosine transform further comprises:

substituting at least one diagonal matrix in place of at least one identity matrix.

7. A method as recited in claim 5, wherein the processing of the first signal into the discrete cosine transform domain further comprises the steps of:

receiving an MPEG-2 encoded signal, decompressing the MPEG-2 encoded signal into the first signal, and placing the first signal within the discrete cosine transform domain.

8. A method as recited in claim 5, wherein the first signal comprises a high definition television signal, and the second signal comprises a standard definition television signal.

9. A method as recited in claim 5, wherein the discrete cosine transform domain comprises a two-dimensional domain.

10. A method as recited in claim 5, wherein the first signal, after placement within the discrete cosine transform domain, comprises a plurality of data in mathematical matrix form.

11. A method as recited in claim 5, further comprising the step of:

outputting the second signal for utilization with a display.

12. A method as recited in claim 5, wherein the inverse discrete cosine transform comprises:

an N-to-M conversion, wherein

M is a non-zero integer, and wherein

N is a non-zero integer that is greater than M.

13. A method as recited in claim 5, wherein N is equal to two, and M is equal to one.

14. A method for converting a higher resolution signal to a lower resolution signal, comprising the steps of:

processing a first signal so as to place the first signal within a discrete cosine transform domain, performing an inverse discrete cosine transform upon the first signal by utilizing a diagonal matrix, within the discrete cosine transform domain, generating a second signal from at least a portion of the first signal, wherein the second signal has a resolution that is lower than the first signal, wherein the first signal, after placement within the discrete cosine transform domain, comprises a plurality of data in mathematical matrix form, and premultiplying a data matrix with the diagonal matrix, post multiplying the data matrix with the diagonal matrix, obtaining a first discrete cosine transform matrix from the premultiplying step wherein the first discrete cosine transform matrix is of a smaller size than the data matrix, obtaining a second discrete cosine transform matrix from the post multiplying step, wherein the second discrete cosine transform matrix is of a smaller size than the data matrix, and performing an inverse discrete cosine transform on each of the first and second discrete cosine transform matrices.

15. An apparatus for converting a higher resolution signal into a lower resolution signal, comprising:

a decoder processor unit, wherein the decoder processor unit processes the first signal into a discrete cosine transform domain, wherein the decoder processor unit further comprises:

a discrete cosine transform domain portion for processing the first signal, an inverse discrete cosine transform portion for performing an inverse discrete cosine transform upon the first signal within the discrete cosine transform domain portion wherein the inverse discrete cosine transform utilizes a diagonal matrix, wherein the first signal comprises a mathematical matrix form in the discrete cosine transform domain portion, and wherein the decoder processor unit further comprises:

a pre-multiply portion, for pre-multiplying a matrix of the first signal with the diagonal matrix, and a post-multiply portion, for post-multiplying a matrix of the first signal with the diagonal matrix.

16. An apparatus as recited in claim 15, wherein the decoder processor unit further comprises:

a memory portion, and wherein the diagonal matrix comprises predetermined values that are stored in the memory portion.

17. An apparatus as recited in claim 16, wherein at least one of the predetermined values of the diagonal matrix is a result of an iterative computation, and wherein the iterative computation is performed until a predetermined threshold value is reached, and wherein at least one predetermined value is utilized so that the diagonal matrix is substituted for an identity matrix.

18. A method for converting a higher resolution signal into a lower resolution signal, comprising the steps of:

processing a first signal, selecting and retaining a plurality of high frequency components from the first signal, utilizing at least a portion of the plurality of high frequency components in the processing of the first received signal, inverse discrete transform processing at least a portion of the plurality of high frequency components so as to place the results in a full resolution domain, generating a second signal that has a lower resolution than the first signal, by utilizing at least a portion of the plurality of high frequency components, and by utilizing the inverse discrete cosine transform step, and wherein the conversion from the first signal to the second signal comprises a minimal drift conversion operation.

* * * * *